US010102374B1

(12) United States Patent
Cohen et al.

(10) Patent No.: US 10,102,374 B1
(45) Date of Patent: Oct. 16, 2018

(54) METHOD OF REMEDIATING A PROGRAM AND SYSTEM THEREOF BY UNDOING OPERATIONS

(71) Applicant: Sentinel Labs Israel Ltd., Tel Aviv (IL)

(72) Inventors: Almog Cohen, Tel Aviv (IL); Tomer Weingarten, Petah Tikva (IL); Shlomi Salem, Tel Aviv (IL); Nir Izraeli, Tel-Mond (IL); Asaf Karelsbad, Ramat-Gan (IL)

(73) Assignee: Sentinel Labs Israel Ltd., Tel Aviv (IL)

( * ) Notice: Subject to any disclaimer, the term of this patent is extended or adjusted under 35 U.S.C. 154(b) by 0 days.

(21) Appl. No.: 15/766,339

(22) PCT Filed: Oct. 13, 2016

(86) PCT No.: PCT/IL2016/051110
§ 371 (c)(1),
(2) Date: Apr. 5, 2018

(87) PCT Pub. No.: WO2017/064710
PCT Pub. Date: Apr. 20, 2017

Related U.S. Application Data

(63) Continuation-in-part of application No. 14/456,127, filed on Aug. 11, 2014, now Pat. No. 9,710,648.
(Continued)

(51) Int. Cl.
*H04L 29/06* (2006.01)
*G06F 21/56* (2013.01)
(Continued)

(52) U.S. Cl.
CPC ............ *G06F 21/568* (2013.01); *G06F 9/545* (2013.01); *G06F 21/552* (2013.01); *G06F 21/554* (2013.01); *G06F 21/566* (2013.01)

(58) Field of Classification Search
None
See application file for complete search history.

(56) References Cited

U.S. PATENT DOCUMENTS 6,154,844 A   11/2000  Touboul et al.
6,804,780 B1  10/2004  Touboul
(Continued)

FOREIGN PATENT DOCUMENTS

WO   WO 02/27440 A2     4/2002
WO   WO 2012/027669 A1  3/2012
(Continued)

OTHER PUBLICATIONS

Dini, Gianluca; Martinelli, Fabio; Saracino, Andrea; Sgandurra, Daniele; "Probabilistic Contract Compliance for Mobile Applications", Eighth International Conference on Availability, Reliability and Security (ARES) IEEE, Sep. 2-6, 2013, pp. 599-606.
(Continued)

*Primary Examiner* — William J. Goodchild
(74) *Attorney, Agent, or Firm* — Knobbe, Martens, Olson & Bear LLP

(57) ABSTRACT

There is provided a system and a computerized method of remediating a given program running in an operating system, the method comprising: querying a stateful model to retrieve a group of entities related to the given program; terminating at least a sub set of the group of entities related to the given program; generating a remediation plan including one or more operations linked to the given program, the one or more operations being retrieved based on the group in the stateful model; and executing the remediation plan by undoing at least part of the one or more operations linked to the given program thereby restoring state of the operating system to a state prior to the given program being executed. There is further provided a computerized method of detect-
(Continued)

ing malicious code related to a program in an operating system in a live environment.

32 Claims, 8 Drawing Sheets

Related U.S. Application Data

(60) Provisional application No. 62/241,817, filed on Oct. 15, 2015.

(51) Int. Cl.
*G06F 21/55* (2013.01)
*G06F 9/54* (2006.01)

(56) References Cited

U.S. PATENT DOCUMENTS

| | | |
|---|---|---|
| 7,076,696 B1 | 7/2006 | Stringer |
| 7,093,239 B1 | 8/2006 | Van der Made |
| 7,530,106 B1 | 5/2009 | Zaitsev et al. |
| 7,832,012 B2 | 11/2010 | Huddleston |
| 8,042,186 B1 | 10/2011 | Polyakov et al. |
| 8,141,154 B2 | 3/2012 | Gruzman et al. |
| 8,171,545 B1 | 5/2012 | Cooley et al. |
| 8,370,931 B1 | 2/2013 | Chien et al. |
| 8,555,385 B1 | 10/2013 | Bhatkar et al. |
| 8,607,340 B2 | 12/2013 | Wright |
| 8,677,494 B2 | 3/2014 | Edery et al. |
| 9,117,078 B1 | 8/2015 | Chien et al. |
| 9,369,476 B2 | 6/2016 | Chekina et al. |
| 9,606,893 B2 | 3/2017 | Gupta et al. |
| 9,607,146 B2 | 3/2017 | Sridhara et al. |
| 9,710,648 B2 | 7/2017 | Weingarten |
| 2002/0178374 A1 | 11/2002 | Swimmer et al. |
| 2004/0243699 A1 | 12/2004 | Koclanes et al. |
| 2007/0100905 A1 | 5/2007 | Masters et al. |
| 2007/0101431 A1 | 5/2007 | Clift et al. |
| 2007/0240215 A1 | 10/2007 | Flores et al. |
| 2009/0089040 A1 | 4/2009 | Monastyrsky et al. |
| 2009/0199296 A1 | 8/2009 | Xie et al. |
| 2010/0005339 A1 | 1/2010 | Hooks |
| 2010/0293615 A1 | 11/2010 | Ye |
| 2011/0023118 A1 | 1/2011 | Wright et al. |
| 2011/0145920 A1 | 6/2011 | Mahaffey et al. |
| 2011/0185430 A1 | 7/2011 | Sallam |
| 2011/0219449 A1* | 9/2011 | St. Neitzel ............ G06F 11/00 726/23 |
| 2011/0247071 A1 | 10/2011 | Hooks et al. |
| 2011/0271341 A1 | 11/2011 | Satish et al. |
| 2012/0079596 A1 | 3/2012 | Thomas et al. |
| 2012/0137342 A1 | 5/2012 | Hartrell et al. |
| 2012/0137367 A1 | 5/2012 | Dupont et al. |
| 2012/0255003 A1 | 10/2012 | Sallam |
| 2013/0152200 A1 | 6/2013 | Alme et al. |
| 2013/0247190 A1 | 9/2013 | Spurlock |
| 2013/0290662 A1 | 10/2013 | Teal |
| 2014/0053267 A1 | 2/2014 | Klein et al. |
| 2014/0068326 A1* | 3/2014 | Quinn ............ G06F 11/0709 714/15 |
| 2014/0090061 A1 | 3/2014 | Avasarala et al. |
| 2014/0237595 A1 | 8/2014 | Sridhara et al. |
| 2014/0283076 A1 | 9/2014 | Muttik |
| 2015/0082430 A1 | 3/2015 | Sridhara et al. |
| 2015/0089655 A1 | 3/2015 | Choi et al. |
| 2015/0121524 A1 | 4/2015 | Fawaz et al. |
| 2015/0163121 A1 | 6/2015 | Mahaffey et al. |
| 2015/0172300 A1 | 6/2015 | Cochenour |
| 2015/0199512 A1 | 7/2015 | Kim et al. |
| 2015/0205962 A1 | 7/2015 | Swidowski et al. |
| 2015/0220735 A1 | 8/2015 | Paithane et al. |
| 2015/0264077 A1 | 9/2015 | Berger et al. |
| 2015/0281267 A1 | 10/2015 | Danahy et al. |
| 2015/0286820 A1 | 10/2015 | Sridhara et al. |
| 2015/0350236 A1 | 12/2015 | Klinghofer et al. |
| 2016/0042179 A1 | 2/2016 | Weingarten |
| 2016/0042180 A1* | 2/2016 | Sayre ............ G06F 21/563 726/23 |
| 2016/0078365 A1 | 3/2016 | Baumard |

FOREIGN PATENT DOCUMENTS

| | | |
|---|---|---|
| WO | WO 2016/024268 | 2/2016 |
| WO | WO 2017/064710 | 4/2017 |

OTHER PUBLICATIONS

Laureano et al., M., "Intrusion detection in virtual machine environments. In Euromicro Conference, 2004. Proceedings." 30th (pp. 520-525). IEEE Sep. 30, 2004.

Liu, Yu-Feng; Zhang Li-Wei; Liang, Juan; Qu, Sheng; Ni, Zhi-Qiang;, "Detecting Trojan Horses Based on System Behavior Using Machine Learning Method", International Conference on Machine Learning and Cybernetics (ICMLC), IEEE, Jul. 11-14, 2010, pp. 855-860.

Shosha et al., A.F., "Evasion-resistant malware signature based on profiling kernel data structure objects." In 2012 7th International Conference on Risks and Security of Internet and Systems (CRISIS) (pp. 1-8). IEEE., Oct. 31, 2012.

Xu, J-Y; Sung, A.H.; Chavez, P.; Mukkamala, S.; "Polymorphic Malicious Executable Scanner by API Sequence Analysis", Fourth International Conference on Hybrid Intelligent Systems, IEEE Dec. 5-8, 2004, pp. 378-383.

International Search Report and Written Opinion dated Feb. 18, 2016 for International Application No. PCT/IL2015/050802, in 10 pages.

International Preliminary Report on Patentability dated Feb. 14, 2017 for International Application No. PCT/IL2015/050802, in 7 pages.

International Search Report and Written Opinion dated Apr. 20, 2017 for International Application No. PCT/IL2016/051110, in 10 pages.

Communication Pursuant to Article 94(3) EPC dated Jun. 20, 2018 for European Application 15 760 520.5, in 7 pages.

* cited by examiner

METHOD OF REMEDIATING A PROGRAM AND SYSTEM THEREOF BY UNDOING OPERATIONS

TECHNICAL FIELD

The presently disclosed subject matter relates, in general, to the field of the system remediation, and more specifically, to methods and systems for remediating operations performed by a program in an operating system.

BACKGROUND OF THE INVENTION

With the rapid growth of computer technology and widespread Internet access, malware threats have continued to grow significantly in recent decades, and thus have caused severe damage to systems, such as hardware failures and loss of critical data, etc.

Various antivirus technologies are currently in use, including signature and behavior based analysis, which aim to identify and prevent further spread of malware in the network. Signature-based analysis involves searching for known patterns of malicious code within executable code. However, malware is often modified (e.g., by obfuscating and randomizing content) in order to change its signature without affecting functionality, which renders the signature-based analysis mechanism as being increasingly ineffective. Due to an increase in malware variants (e.g., malware variants with the same behavior but different signatures), behavior-based analysis may be used to identify malware variants that have similar effects and thus can be handled with similar security measures.

Behavior-based analysis detects malware by monitoring behaviors of malicious activities rather than static signatures. Existing behavioral monitoring systems include a database of actions that are blacklisted and indicate malicious intent. If a given process or program performs any of the actions listed in the database, the action is blocked, and the process may be identified as malicious, and thus be terminated, by the monitoring system.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 8,555,385 (Bhatkar et al.) entitled "Techniques for behavior based malware analysis" discloses techniques for behavior based malware analysis. In one particular embodiment, the techniques may be realized as a method for behavior based analysis comprising receiving trace data, analyzing, using at least one computer processor, observable events to identify low level actions, analyzing a plurality of low level actions to identify at least one high level behavior, and providing an output of the at least one high level behavior.

U.S. Pat. No. 7,530,106 (Zaitsev et al.) entitled "System and method for security rating of computer processes" discloses a system, method, and computer program product for secure rating of processes in an executable file for malware presence, comprising: (a) detecting an attempt to execute a file on a computer; (b) performing an initial risk assessment of the file; (c) starting a process from code in the file; (d) analyzing an initial risk pertaining to the process and assigning an initial security rating to the process; (e) monitoring the process for the suspicious activities; (f) updating the security rating of the process when the process attempts to perform the suspicious activity; (g) if the updated security rating exceeds a first threshold, notifying a user and continuing execution of the process; and (h) if the updated security rating exceeds a second threshold, blocking the action and terminating the process.

U.S. Pat. No. 8,607,340 (Wright) entitled "Host intrusion prevention system using software and user behavior analysis" discloses improved capabilities for threat detection using a behavioral-based host-intrusion prevention method and system for monitoring a user interaction with a computer, software application, operating system, graphic user interface, or some other component or client of a computer network, and performing an action to protect the computer network based at least in part on the user interaction and a computer code process executing during or in association with a computer usage session.

US Patent Application No. 2012/079,596 (Thomas et al.) entitled "Method and system for automatic detection and analysis of malware" discloses a method of detecting malicious software (malware) including receiving a file and storing a memory baseline for a system. The method also includes copying the file to the system, executing the file on the system, terminating operation of the system, and storing a post-execution memory map. The method further includes analyzing the memory baseline and the post-execution memory map and determining that the file includes malware.

SUMMARY OF THE INVENTION

In accordance with certain aspects of the presently disclosed subject matter, there is provided a computerized method of remediating one or more operations linked to a given program running in an operating system, the method comprising: querying a stateful model to retrieve a group of entities related to the given program, the stateful model being a logical data structure representing composition and state of the operating system in a live environment, the stateful model including a network of one or more interconnected objects representing one or more entities constituting the operating system, and one or more attributes characterizing each object, the objects being divided into one or more groups each representing a corresponding group of entities related to a respective program or part thereof running in the operating system, the attributes of each object including at least: i) a group indicator indicating to which group the object belongs, ii) one or more operations associated with the object, the object being source or target of the associated operations, the associated operations being linked to the given program, and iii) one or more interconnections between the object and one or more other objects through the associated operations, wherein the group of entities related to the given program are retrieved based on a corresponding group of objects which represent the group of entities in the stateful model; terminating at least a sub set of the group of entities related to the given program; generating a remediation plan including one or more operations linked to the given program, the one or more operations being retrieved based on the group in the stateful model; and executing the remediation plan by undoing at least part of the one or more operations linked to the given program thereby restoring state of the operating system to a state prior to the given program being executed.

In addition to the above features, the method according to this aspect of the presently disclosed subject matter can comprise one or more of features (i) to (xxiii) listed below, in any desired combination or permutation which is technically possible:

(i). each of the objects is of a type selected from a group that includes: thread object, process object, file object, network object, registry object, windows object, and memory object, which represents respectively an entity of thread, process, file, network, registry, windows and memory.

(ii). the objects are divided into one or more groups based on a predefined grouping rule set.

(iii). the predefined grouping rule set includes a rule of creating a new group if source of a process creation operation is a designated system entity.

(iv). the predefined grouping rule set includes a rule indicating a group is terminated if target of a process termination operation is a last entity alive in the group.

(v). the attributes further include bookkeeping information of the operations associated with the object, the bookkeeping information including one or more of the following: file-system access statistics, memory manipulation history, modification to system settings, and interactions between entities.

(vi). the bookkeeping information is generated by keeping track of operations related to modification and/or manipulation.

(vii). a group of objects are further divided into one or more sub groups each related to a part of a program, and the attributes further include sub-group indicator indicating to which sub group the object belongs, wherein the querying including querying a stateful model to retrieve a sub group of entities related to a part of the given program; and wherein the terminating includes terminating the sub group of entities related to the part of the given program.

(viii). generating the stateful model and identifying the given program by analyzing the stateful model.

(ix). optimizing the remediation plan by consolidating the one or more operations linked to the given program based on type of each of the operations, giving rise to a consolidated remediation plan, and wherein the executing includes executing the consolidated remediation plan.

(x). the consolidating includes categorizing objects involved in the one or more operations linked to the given program into one or more categories, each category directed to at least one respective type of operation performed upon objects within the category, and wherein the consolidated remediation plan includes the one or more categories of objects.

(xi). the consolidated remediation plan includes at least one of the following categories: a category of created objects, and a category of modified/deleted objects.

(xii). each of the objects involved in the one or more operations linked to at least the given program belongs to only one of the categories such that the categories of objects are mutually exclusive.

(xiii). the consolidated remediation plan further includes one or more undo actions associated with each of the categories of objects, the undo actions being one or more opposite operations to be executed in order to revert the one or more operations linked to at least the given program on objects within each of the categories.

(xiv). one of the undo actions associated with a category of created objects is to remove an actual system entity represented by each object within the category.

(xv). one of the undo actions associated with a category of modified/deleted objects is to restore, for an actual system entity represented by each object within the category, to a previous content thereof prior to the given program or part thereof being executed.

(xvi). one of the undo actions associated with an object within the category of modified/deleted objects, in case of the object undergoing a plurality of modifications, is to restore, for an actual system entity represented by the object, to an original content thereof prior to the plurality of modifications.

(xvii). the executing consolidated remediation plan includes performing, for each object within a category of the categories of objects, the undo actions associated with the category.

(xviii). the executing consolidated remediation plan is performed in accordance with type of each object within a category.

(xix). the previous content of each object is recorded in the stateful model or in a filesystem history module.

(xx). the given program is linked to at least a second program as a result of manipulation, and the method comprises:
querying a stateful model to retrieve a first group of entities related to the given program and a second group of entities related to the second program, wherein a sub set of the operations directly linked to the second program which occur as a result of the manipulation are indirectly linked to the given program;
determining a sub set of the second group of entities that are manipulated by the given program to be terminated and terminating the sub set of the second group of entities;
generating a remediation plan including one or more operations linked to the given program; and
executing the remediation plan by undoing at least part of the one or more operations linked to the given program thereby restoring state of the operating system to a state prior to the given program being executed.

(xxi). the executing the remediation plan is performed by undoing each of the one or more operations linked to at least the given program.

(xxii). the given program is a malware or a benign program.

(xxiii). the given program is a benign program and the one or more entities related to the given program include at least one entity performing malicious operations due to manipulation of the given program by malicious code, and wherein the one or more operations linked to at least the given program are selected to be the malicious operations.

In accordance with other aspects of the presently disclosed subject matter, there is provided a computerized system of remediating one or more operations linked to a given program running in an operating system, the system comprising a processor operatively connected to a memory, the processor configured to: query a stateful model to retrieve a group of entities related to the given program, the stateful model being a logical data structure representing composition and state of the operating system in a live environment, the stateful model including a network of one or more interconnected objects representing one or more entities constituting the operating system, and one or more attributes characterizing each object, the objects being divided into one or more groups each representing a corresponding group of entities related to a respective program or part thereof running in the operating system, the attributes of each object including at least: i) a group indicator indicating to which group the object belongs, ii) one or more operations associated with the object, the object being source or target of the associated operations, the associated operations being linked to the given program, and iii) one or more interconnections between the object and one or more other objects through the associated operations, wherein the group of entities related to the given program are retrieved based on a corresponding group of objects which represent the group of entities in the stateful model; terminate at least a sub set of the group of entities related to the given program; generate a remediation plan including one or more operations linked to the given program, the one or more operations being retrieved based on the group in the stateful model; and execute the remediation plan by undoing at least part of the one or more operations linked to the given program thereby restoring state of the operating system to a state prior to the given program being executed.

This aspect of the disclosed subject matter can comprise one or more of features (i) to (xxiii) listed above with respect to the method, mutatis mutandis, in any desired combination or permutation which is technically possible.

In accordance with other aspects of the presently disclosed subject matter, there is provided a non-transitory program storage device readable by machine, tangibly embodying a program of instructions executable by the machine to remediate one or more operations linked to a given program running in an operating system, comprising the steps of the following: querying a stateful model to retrieve a group of entities related to the given program, the stateful model being a logical data structure representing composition and state of the operating system in a live environment, the stateful model including a network of one or more interconnected objects representing one or more entities constituting the operating system, and one or more attributes characterizing each object, the objects being divided into one or more groups each representing a corresponding group of entities related to a respective program or part thereof running in the operating system, the attributes of each object including at least: a group indicator indicating to which group the object belongs, ii) one or more operations associated with the object, the object being source or target of the associated operations, the associated operations being linked to the given program, and iii) one or more interconnections between the object and one or more other objects through the associated operations, wherein the group of entities related to the given program are retrieved based on a corresponding group of objects which represent the group of entities in the stateful model; terminating at least a sub set of the group of entities related to the given program; generating a remediation plan including one or more operations linked to the given program, the one or more operations being retrieved based on the group in the stateful model; and executing the remediation plan by undoing at least part of the one or more operations linked to the given program thereby restoring state of the operating system to a state prior to the given program being executed.

This aspect of the disclosed subject matter can comprise one or more of features (i) to (xxiii) listed above with respect to the method, mutatis mutandis, in any desired combination or permutation which is technically possible.

In accordance with certain aspects of the presently disclosed subject matter, there is provided a computerized method of detecting malicious code related to a program in an operating system in a live environment, the method comprising: monitoring one or more operations performed in the operating system in the live environment and generating an event data characterizing each monitored operation, wherein the event data includes at least the following attributes of the monitored operation: operation type, and source of the operation; building a stateful model in accordance with the event data characterizing each monitored operation, the stateful model being a logical data structure representing composition and state of the operating system in the live environment, wherein the building comprises: for each event data characterizing a monitored operation: i) retrieving one or more objects from the event data, the objects representing one or more entities involved in the monitored operation, each object being of a type selected from a group that includes: process object, file object, network object, registry object, windows object and memory object, at least one of the objects representing the source of the operation; ii) dividing the objects into one or more groups in accordance with a predefined grouping rule set, each group representing a corresponding group of entities related to a respective program or part thereof running in the operating system; iii) generating one or more attributes characterizing each object, the attributes including at least: a) grouping information including a group indicator indicating to which group the object belongs, b) one or more operations associated with the object, the object being source or target of the associated operations, the associated operations being linked to the given program, and c) one or more interconnections between the object and one or more other objects through the associated operations, and iv) in case of the monitored operation being a first operation of a stateful model, generating a stateful model including the objects and the attributes thereof; otherwise updating a stateful model based on the objects and the attributes thereof, thereby giving rise to an updated stateful model including a network of interconnected objects representing one or more entities constituting the operating system, and one or more attributes thereof indicating the grouping information, operations associated with the objects, and interconnections between the objects through the associated operations; analyzing the stateful model to identify one or more behaviors including at least one malicious behavior, including: analyzing the updated stateful model in accordance with one or more predefined behavioral logics, wherein the one or more predefined behavior logics are behavior signatures indicative of specific behavioral patterns, the analyzing taking into consideration the grouping information of the objects, the interconnection between the objects and the operations associated with the objects; and determining that at least one malicious behavior of the one or more behaviors is present if any of the one or more predefined behavioral logics are met, and determining the presence of malicious code based on the at least one malicious and determining a program or part thereof related to the malicious code to be malicious.

In addition to the above features, the method according to this aspect of the presently disclosed subject matter can comprise one or more of features (i) to (vi) listed below, as well as one or more of features (i) to (xxiii) listed above with respect to the method of remediation, in any desired combination or permutation which is technically possible:

(i). the program includes one or more parts, and wherein a group of objects are further divided into one or more sub groups each related to a part of the program, and the grouping information further includes a sub-group indicator indicating to which sub group each object belongs.

(ii). remediating one or more operations linked to the program.

(iii). the remediating includes:

querying the stateful model to retrieve a group of entities related to the program, wherein the group of entities related to the program are retrieved based on a corresponding group of objects which represent the group of entities in the stateful model;

terminating at least a sub set of the group of entities related to the program;

generating a remediation plan including one or more operations linked to the program, the one or more operations being retrieved from the group in the stateful model; and executing the remediation plan by undoing at least part of the one or more operations linked to the given program thereby restoring state of the operating system to a state prior to the program being executed.

(iv). the predefined behavioral logics include determining a behavior of self-execution when the following condition is met: a target of a process creation operation is an object that is included in the same group as a source of the process creation operation.

(v). the predefined behavioral logics include determining a behavior of self-deletion when the following condition is met: a target of a file deletion operation is a source file associated with a source process of the file deletion operation.

(vi). the predefined behavioral logics include determining a behavior of code injection when the following condition is met: a process manipulates another process to perform operations on its behalf.

BRIEF DESCRIPTION OF THE DRAWINGS

In order to understand the presently disclosed subject matter and to see how it may be carried out in practice, the subject matter will now be described, by way of non-limiting example only, with reference to the accompanying drawings, in which.

DETAILED DESCRIPTION

Figure 1A:
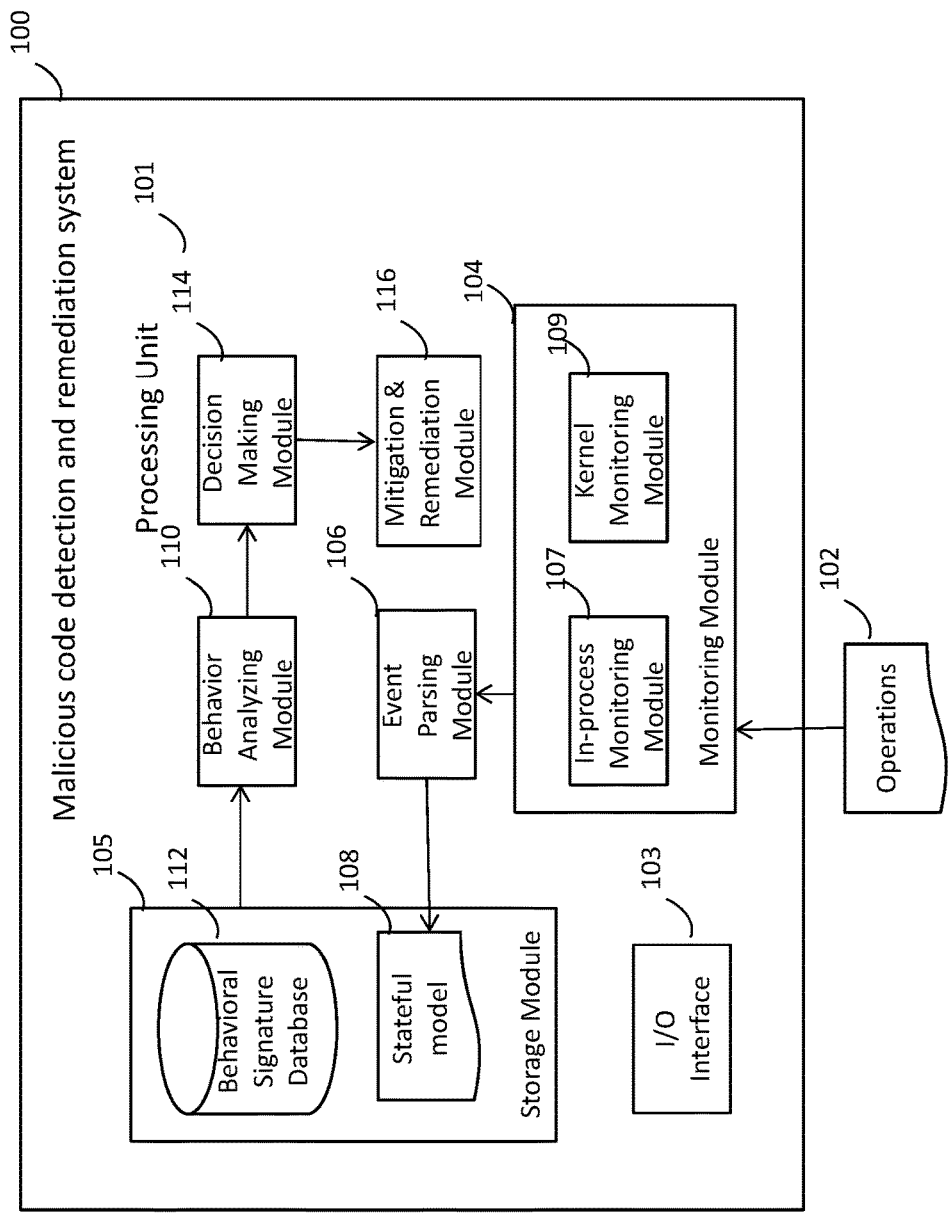
FIG. 1a is a functional block diagram schematically illustrating a malicious code detection and remediation system, in accordance with certain embodiments of the presently disclosed subject matter.

In the following detailed description, numerous specific details are set forth in order to provide a thorough understanding of the disclosed subject matter. However, it will be understood by those skilled in the art that the present disclosed subject matter can be practiced without these specific details. In other instances, well-known methods, procedures, and components have not been described in detail so as not to obscure the present disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "querying", "dividing", "grouping", "bookkeeping", "remediating", "terminating", "generating", "executing", "optimizing", "consolidating", "categorizing", "restoring", "monitoring", "building", "analyzing", "determining", "updating", or the like, include action and/or processes of a computer that manipulate and/or transform data into other data, said data represented as physical quantities, e.g. such as electronic quantities, and/or said data representing the physical objects.

The terms "computer", "computerized device", "processor", "processing unit", "host machine", and "end user station" should be expansively construed to include any kind of electronic device with data processing capabilities, including, by way of non-limiting examples, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein can be performed by a computer specially constructed for the desired purposes or by a general purpose computer specially configured for the desired purpose by a computer program stored in a non-transitory computer readable storage medium.

The terms "non-transitory" and "non-transitory storage medium" are used herein to exclude transitory, propagating signals, but to otherwise include any volatile or non-volatile computer memory suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination.

Figure 1B:
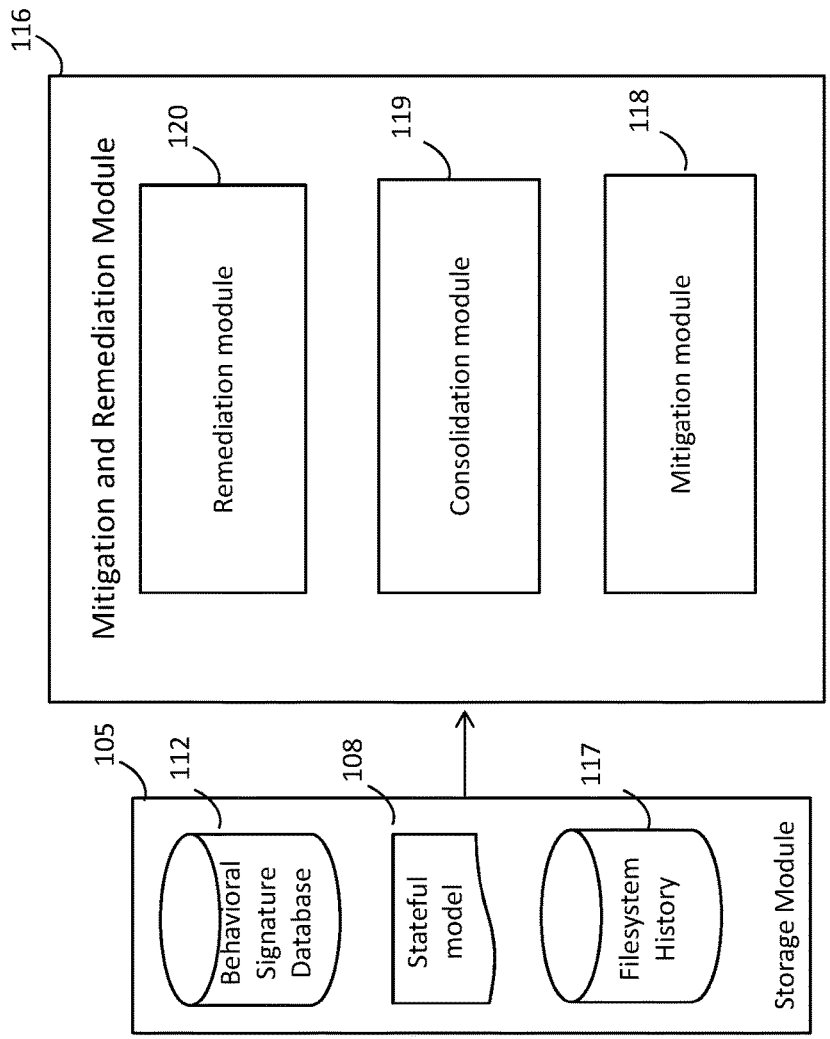
FIG. 1b is a functional block diagram schematics providing an in depth illustration of the mitigation and remediation module, in accordance with certain embodiments of the presently disclosed subject matter.

In embodiments of the presently disclosed subject matter, fewer, more and/or different stages than those shown in FIGS. 2-3 and 5-7 may be executed. In embodiments of the presently disclosed subject matter one or more stages illustrated in FIGS. 2-3 and 5-7 may be executed in a different order and/or one or more groups of stages may be executed simultaneously. FIGS. 1a and 1b illustrate a general schematic of the system architecture in accordance with an embodiment of the presently disclosed subject matter. Each module in FIGS. 1a and 1b can be made up of any combination of software, hardware and/or firmware that performs the functions as defined and explained herein. The modules in FIGS. 1a and 1b may be centralized in one location or dispersed over more than one location. In other embodiments of the presently disclosed subject matter, the system may comprise fewer, more, and/or different modules than those shown in FIGS. 1a and 1b.

The term "malicious code" used in this specification should be expansively construed to include any kind of code in a software system or script that is intended to cause undesired effects, security breaches or damage to the system. According to certain embodiments, malicious code can include at least the following: malware and exploit. The term "malware" used in this specification should be expansively construed to include any kind of computer virus, ransomware, worms, trojan horses, rootkits, keyloggers, dialers, spyware, adware, malicious Browser Helper Objects (BHOs), rogue security software, or any other malicious or undesirable programs. The term "exploit" used in this specification should be expansively construed to include any piece of software, a chunk of data, or a sequence of commands that takes advantage of a bug or vulnerability in a given program or application (such as, e.g., a benign program) in order to cause unintended or unanticipated behavior to occur on computer software, hardware, etc. The term "vulnerability" of a program should be expansively construed to include the following: a software bug, weakness or design flaw allowing an attacker to manipulate the program to perform or enable unintended or harmful actions. The behavior of the exploit taking advantage of a given program can be referred as exploitation. In the context of an exploit, the part which is responsible for facilitating the unintended or harmful result caused by the exploit is normally referred to as the payload. For illustration purpose and by way of example, an exploit can be in the form of a specially crafted document file (i.e. PDF, DOC, etc) that takes advantage of (i.e. exploits) a weakness in the software that is being used to render (i.e. open) it (e.g., Acrobat Reader, Microsoft Word, etc) in order to execute arbitrary code (i.e. payload) included in the crafted document file. In this example, the content of the document file has no meaning as the sole purpose of the file is to trigger a bug in the software which attempts to read it in order to make it perform potentially malicious actions on behalf of the creator of that malicious document.

Another example of an exploit can be in the form of malicious content served by a website to clients that access that website. The aim of the owner or attacker of such a website is to take advantage of a flaw in the software (i.e. Browser) that is being used to render its content in order to execute the owner or attacker's potentially malicious code on the victim's operating system.

For purpose of illustration only, certain embodiments of the following description are provided with respect to malware. Embodiments are, likewise, applicable to detection and remediation of other kind of malicious code, such as, e.g., exploit.

As aforementioned, behavior-based analysis detects malware by monitoring behaviors of malicious activities rather than static signatures. There are a number of problems existing in current behavior-based technologies. For instance, due to the frequently changing behaviors of malicious programs, new instances of malwares may not be detected immediately due to lack of information about their behaviors and functionality. Current behavior-based technologies may also fail to trace a sequence of events, each of which, independently, is not identified as malicious, but when considered within the sequence context, is actually performing a malicious action. Moreover, current behavior-based technologies are normally implemented by performing emulation and running suspected malware in a safe environment (e.g., a sandboxed virtual machine) to reveal otherwise obscured logics and behaviors. This kind of emulation is normally very limited and the suspected malware under scrutiny never actually runs in a live environment. Thus it is impossible to actually observe full execution and interaction of the suspected malware with other processes and files that are not emulated in the safe environment. Therefore, not all potential malicious behaviors of the suspected malware can be detected by performing such emulation. Furthermore, it is typically resource-intensive to collect and analyze the large amount of operation information contained by suspicious malwares in order to identify potential behaviors, especially for a host machine with limited resources, such as an end user station. Certain embodiments of the detailed description are able to cope with these problems.

Bearing this in mind, attention is drawn to FIG. 1a, schematically illustrating a functional block diagram of a malware detection and remediation system in accordance with certain embodiments of the presently disclosed subject matter.

A Malicious code Detection and Remediation System 100 illustrated in FIG. 1a implements a computer-based malicious code detection and remediation mechanism, which enables end users to detect and remediate malicious code, such as malware, in real time in a live environment. The term "live environment" used in this specification should be expansively construed to include any kind of system configuration of an operating system where computer programs and products are actually put into operation for their intended uses by end users, such as, for example, an end user station with programs concurrently running in a production environment, in contrast to a safe environment, such as, for example, an emulated environment, or a sandboxed virtual machine environment. It is to be noted that although certain embodiments of below description are described in respect of detecting malware, such embodiments are, likewise, applicable to detection of unintended or malicious operations performed by a benign program, the benign program being injected or manipulated by malicious code, such as, e.g., exploit, etc. In such cases, as aforementioned, exploitation refers to the behavior or the course of action that exploit takes advantage of the benign program to perform malicious operations.

As shown, the Malicious code Detection and Remediation 100 includes at least one Processing Unit 101 that comprises the following functional modules: Monitoring Module 104, Event Parsing Module 106, Behavior Analyzing Module 110, and Decision Making Module 114. Alternatively the Processing Unit 101 can be operatively coupled to the functional modules, and configured to receive instructions therefrom and execute operations in accordance with the instructions.

The Processing Unit 101 can be configured to execute several functional modules (e.g., the functional modules 104, 106, 110, 114, etc.) in accordance with computer-readable instructions implemented on a non-transitory computer readable storage medium. Such functional modules are referred to hereinafter as comprised in the processing unit.

The Monitoring Module 104 can be configured to monitor, in real time, one or more operations 102 of at least one computer program that runs concurrently in the live environment. It is to be noted that the term "operation" used in this specification should be expansively construed to include any kinds of actions performed by one or more processes, threads, applications, files or any other suitable entities in any operating system. By way of non-limiting example, in a Windows operating system, operations can be performed by one or more processes of the computer programs. For purpose of illustration only, references are made in part of the following description with respect to operations performed by one or more processes. Embodiments are, likewise, applicable to operations performed by any other suitable entities in any operating system as described above, such as, e.g., operations performed by one or more threads, which are part of processes, etc.

A process is an instance of a computer program that is being executed. A process can further create child processes, and a computer program can be associated with one or more processes. It should be noted that the term "program" used in this specification should be expansively construed to include any kind of system software (e.g., operating system, device drivers, etc.) and application software (e.g., office suites, media players, etc.) that perform specified tasks with a computer. It is to be noted that in the case of exploitation, a program can also refer to any given program (i.e. a benign program) or part thereof that has been manipulated by malicious code to take advantage of the vulnerability or weakness of the given program in order to cause unintended, malicious actions.

As aforementioned, Monitoring Module 104 can monitor one or more operations (e.g., performed by processes or other entities) performed in the operating system in the live system environment. According to certain embodiments, the Monitoring Module 104 can further include two sub-components: an In-process Monitoring Module 107 and a Kernel Monitoring Module 109. The In-process Monitoring Module can monitor all in-process operations that are performed at process level and do not necessarily involve the kernel of an operating system. The Kernel Monitoring Module can monitor all operations that request services from an operating system's kernel, such as file system operations, process and memory operations, registry operations, and network operations, as further elaborated with respect to FIG. 2.

It is to be further noted that, without limiting the scope of the disclosure in any way, in some cases one operation can be construed to include a single action, such as "file read". In some other cases, one operation can also be construed to include a sequence of actions, for example, "file copy" can be regarded as one operation which includes a sequence of three sequential actions "file create", "file read", and "file write".

Event Parsing Module 106 can be configured to build a stateful model 108 in accordance with the one or more operations that are monitored by the Monitoring Module 104. According to certain embodiments, a stateful model is a logical data structure representing composition and state of the operating system in a live environment, the state resulted from a sequence of operations performed in the live environment. The sequence of operations can be linked together by context. Thus the stateful model can be a logical representation of a sequence of linked operations. For instance, the stateful model 108 can include one or more objects derived from real time operations 102, and one or more relationships identified among the objects in accordance with the operations. According to certain embodiments, each of the objects of the stateful model 108 can represent an entity related in the operations and can be of a type selected from a group that includes: process object, file object, network object, registry object, windows object and memory object. The stateful model can further include attributes characterizing the objects and operations associated therewith, as further elaborated with respect to FIGS. 3 and 4.

In the case of exploitation, the sequence of linked operations as described above can include at least the malicious operations performed by a benign program that has been injected or manipulated by malicious code, such as, exploit. Optionally, the sequence of operations represented in the stateful model can further include any non-malicious operations performed by the benign program.

Behavior Analyzing Module 110 can be configured to analyze the stateful model 108 constructed by Event Parsing Module 106 to identify one or more behaviors including at least one malicious behavior indicating the presence of malicious code. It should be noted that the term "behavior" used in this specification should be expansively construed to include any sequence of operations performed by one or more processes that fulfill one or more predefined behavioral logics (also termed as "behavioral signatures" hereinafter).

According to certain embodiments, the Malicious code Detection and Remediation System 100 can further comprise a Storage Module 105 that comprises a non-transitory computer readable storage medium. The Storage Module 105 can include a Behavioral Signature Database 112 that is operatively coupled to the Behavior Analyzing Module 110 and stores the one or more predefined behavioral logics. According to certain embodiments, the predefined behavioral logics are behavioral signatures indicative of specific behavioral patterns. In some cases, the behavioral logics can be predefined based on prior knowledge of certain malware behaviors, such as, for instance, self-deletion, self-execution, and code injection, etc. Optionally, the predefined behavioral logics can also include one or more logics indicative of benign behaviors, as further elaborated with respect to FIG. 2. The stateful model 108 that is built by the Event Parsing Module 106 can also be stored in the Storage Module 105.

Figure 2:
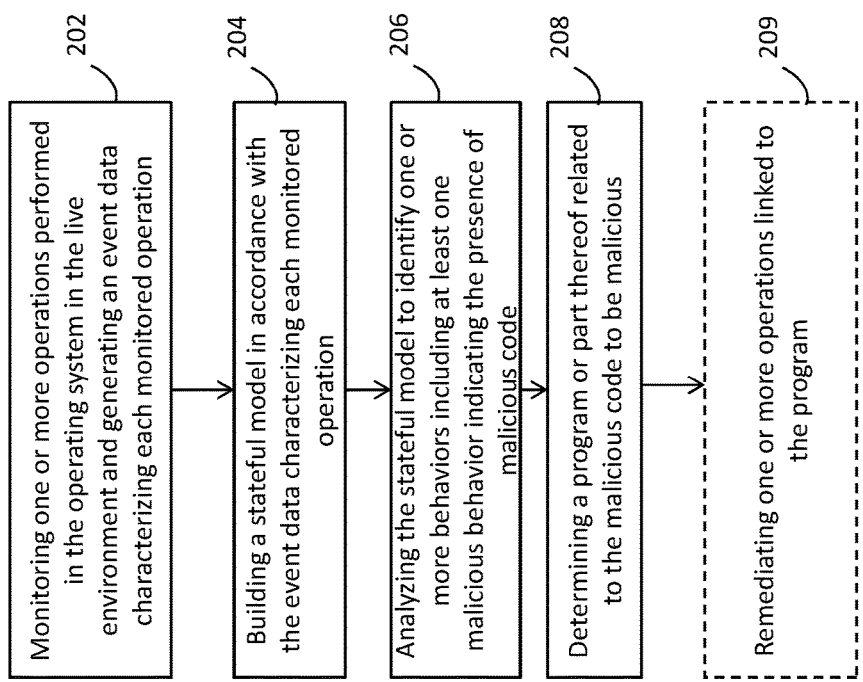
FIG. 2 is a generalized flowchart of detecting malicious code related to a program in an operating system in a live environment and optionally, remediating one or more operations linked to the program in accordance with certain embodiments of the presently disclosed subject matter.

Decision Making Module 114 can be configured to determine a program or part thereof related to the malicious code to be malicious as further elaborated with respect to FIG. 2.

According to certain embodiments, the Processing Unit 101 can further include a Mitigation and Remediation Module 116, which is illustrated in more details in FIG. 1b. The Mitigation and Remediation Module 116 can be configured to remediate one or more operations performed by a given program (e.g., the malware detected as described above) running in an operating system, and can further include a mitigation module 118, a consolidation module 119 and a remediation module 120. The mitigation module 118 can be configured to query the stateful model to retrieve a group of entities related to the given program. The mitigation module 118 can be further configured to terminate at least a sub set of the group of entities related to the given program. The consolidation module 119 can be configured to generate a remediation plan including one or more operations linked to at least the given program, the one or more operations being retrieved based on the group in the stateful model. Optionally further consolidation of the remediation plan can be performed. In certain embodiments, the one or more operations to be included in the remediation plan can be selected in accordance with a predetermined criterion. In the case of exploitation, the given program can be a benign program, and the one or more entities to be terminated refers only to the processes that perform malicious operations due to manipulation of the given program by malicious code, e.g., exploit. And the selected operations to be included in the remediation plan can include at least the malicious operations. The remediation module 120 can be configured to execute the remediation plan by undoing at least part of the operations thereby restoring state of the operating system to a state prior to the given program being executed. The Mitigation and Remediation Module 116 can optionally consult the storage module 105, especially the stateful model 108 and the filesystem history 117 therein during the above described processes.

It is to be noted that although the Mitigation and Remediation Module 116 is illustrated as a module integrated in the system 100 in FIG. 1a, in some embodiments it can be implemented as a standalone system and can be activated in response to an input of any given program, in order to remediate operations performed by such given program. The given program in some cases can be a malware which can be detected in accordance with the above described detection process, or in some other cases the given program can be any program indicated by a user or be obtained from a third party. For example the given program can also be a benign program.

According to further embodiments, the Malicious code Detection and Remediation System 100 can further include an I/O interface 103 communicatively coupled to the Processing Unit 101. The I/O interface 103 can be configured to perform the following actions: receive instructions from end users and/or from one or more of the functional modules, and provide an output of processed information obtained from the functional modules, e.g., an illustration of the determined malware, to the end users. According to certain embodiments, the Processing Unit 101 is further configured to perform at least one of the aforementioned operations of the functional components of the Malicious code Detection and Remediation System 100 in real time.

The operation of the Malicious code Detection and Remediation System 100 and of the various components thereof is further detailed with reference to FIG. 2.

While not necessarily so, the process of operation of the Malicious code Detection and Remediation System 100 can correspond to some or all of the stages of the method described with respect to FIG. 2. Likewise, the method described with respect to FIG. 2 and its possible implementations can be implemented by the Malicious code Detection and Remediation System 100. It is therefore noted that embodiments discussed in relation to the method described with respect to FIG. 2 can also be implemented, mutatis mutandis as various embodiments of the Malicious code Detection and Remediation System 100, and vice versa.

It should be further noted that the aforementioned functional components of the Malicious code Detection and Remediation System 100 can be implemented in a standalone computer, such as the end user station. Or alternatively, one or more of the functional components can be distributed over several computers in different locations. In addition, the above referred modules can, in some cases, be cloud based.

Those versed in the art will readily appreciate that the teachings of the presently disclosed subject matter are not bound by the system illustrated in FIG. 1a. Alternative to the example shown in FIG. 1a, the Malicious code Detection and Remediation System 100 can, in some cases, include fewer, more and/or different modules than shown in FIG. 1a. Equivalent and/or modified functionality can be consolidated or divided in another manner and can be implemented in any appropriate combination of software, firmware and hardware.

Turning now to FIG. 2, there is shown a generalized flowchart of detecting malicious code related to a program in an operating system in a live environment and optionally, remediating one or more operations linked to the program in accordance with certain embodiments of the presently disclosed subject matter.

It is to be noted that the process as described in FIG. 2 can be adapted for detecting malicious operations performed by a benign program, the benign program being manipulated or taken advantage of vulnerability thereof by malicious code, such as, e.g., exploit.

As illustrated in FIG. 2, one or more operations performed in an operating system in a live environment can be monitored (202) in real time, e.g., by the Monitoring Module 104 of the Malicious code Detection and Remediation System 100. As aforementioned, in contrast to a safe environment, a live environment should include one or more computer programs that are put into operation for their intended uses. The computer programs run concurrently and interactively (e.g., with other programs and/or end users) in the live environment. According to certain embodiments, one or more processes can be launched by the one or more programs. Each process can perform one or more operations in order to communicate with and/or request services from the operating system. Accordingly, the Monitoring Module 104 can be configured to monitor the one or more operations performed by each process. In the case of detecting malicious operations performed by a benign program, the monitored operations should include at least one or more operations performed by processes related to the benign program.

Due to the large number of concurrently running programs and operations thereof in a live environment, the amount of information contained in the monitored operations can be huge. According to certain embodiments, the Monitoring Module 104 can be configured to select at least one operation of interest from the one or more operations, and monitor the selected at least one operation of interest.

According to certain embodiments, the at least one operation of interest includes one or more in-process operations and/or one or more kernel related operations. In-process operations can include any operation performed in user space (i.e., the memory area where application software executes) and do not necessarily involve the kernel of an operating system, such as, by way of non-limiting example, local process memory allocation, mapping functions from imported libraries, and read/write process memory. In some cases, the in-process operations can be monitored (e.g., by the In-process Monitoring module) by intercepting one or more library calls (e.g., API calls) that represent the corresponding operations. By way of non-limiting example, the In-process Monitoring module can attach monitoring hooks to the library calls in user space in order to monitor these calls.

The kernel related operations, on the other hand, can include one or more of the following operations that are performed in kernel space (i.e., the memory area reserved for running privileged kernel, kernel extensions, and most device drivers): file system operations, process and memory operations, registry operations, and network Specifically, by way of non-limiting example, file system operations can include any operation and interaction with the storage medium of the host machine. Process and memory operations can include any operation of creating, terminating, modifying, querying, suspending and resuming processes, as well as memory management (e.g., allocating memory, creating a memory section, mapping/unmapping a memory section, writing/reading memory, etc). Registry operations can include any operation related to registry manipulation. And network operations can include any operation of sending or receiving data through network and network connection management.

The kernel related operations can be monitored by the Kernel Monitoring Module through different mechanisms, e.g., in accordance with different operating system platforms. For instance, for Mac OS X operating system, the kernel related operations can be monitored, by way of non-limiting example, by intercepting one or more system calls (in kernel space) that represent the corresponding operations. For the Windows operating system, kernel related operations can be monitored, by way of non-limiting example, by registering one or more kernel filter drivers for the kernel related operations via one or more callback functions. Windows operating system allows new drivers to be registered as part of the existing kernel stack, and thus information regarding a specific type of operation can be filtered by a corresponding kernel filter driver and passed through to the Kernel Monitoring Module via callback functions.

According to certain embodiments, OOB (Out-of-Band) monitoring approach can be adapted in the monitoring process (e.g., by the Kernel Monitoring Module). OOB enables the monitoring module to get notified on selected operations/events while not to have control over these operations/events, which allows the monitoring module to utilize different monitoring mechanisms (e.g., kernel callback functions) to accomplish a full system monitoring in an optimized manner OOB also allows the events to be processed and analyzed into a stateful model in real time while the events are happening, as further described below.

According to certain embodiments, OOB can also enable the sequence of operations described with reference to FIG. 2, e.g., the monitoring operations, building stateful model, analyzing behaviors, determining malware and eliminating the determined malware, to be performed in the same machine, such as an end user station.

It is to be noted that the aforementioned categorized operations that are monitored respectively by different monitoring modules are provided for exemplary purposes only and should not be construed as limiting. For instance, in some cases one or more of the operations monitored by the In-process Monitoring Module can also be monitored by the Kernel Monitoring Module, and vice versa. According to one embodiment, at least one of the kernel related operations can be only monitored by the kernel Monitoring Module.

It should be noted that above mentioned examples of operations and implementations of the monitoring mechanisms are illustrated for exemplary purposes only. Additional kinds of operations and implementations can be applied in addition to or instead of the above.

It is also noted that the implementation mechanisms of the Kernel Monitoring Module can expedite system processing and enable the monitoring of the operations to be performed in a real time manner in a live environment.

According to certain embodiments, each monitored operation of the one or more operations constitutes an event. Each event is indicative of a corresponding monitored operation. The Monitoring Module 104 can be further configured to generate event data characterizing one or more events. Optionally, an event data can be generated (202) to characterize a respective event or a monitored operation. According to certain embodiments, the event data can include at least the following attributes of the respective event: operation type, and source of the event. It is to be noted in certain embodiments of the following description, the terms operation and event are used interchangeably.

Specifically, operation type is an identifier indicative of the type of the monitored operation that constitutes the event. The source of an event is the originating entity that performs the operation. Optionally, event data can include one or more additional attributes. For example, in some cases event data can include a target of an event, such as a targeting process, a targeting file, or any other entities that the operation is performed upon by the source of the event. In some further cases, event data can also include additional attributes according to different types of operations. For instance, event data that characterize file system operations can include additional attributes such as file permissions, full path of the file, size of the file, etc, while event data that characterize process and memory operations can include additional attributes such as address of the memory on which the operation is performed, size of the data that was written or read, memory permissions, etc.

Following step 202, a stateful model can be built (204) in accordance with the event data characterizing each monitored operation, e.g., by the Event Parsing Module 106 of the Malicious code Detection and Remediation System 100, as further described below in detail with respect to FIG. 3. As described above, the stateful model can be a logical data structure representing composition and state of the operating system in the live environment. A sequence of linked operations occurring in the operating system can be included in the stateful model by way of associations with entities of the system that are source or target of such operations, as will be detailed below. In the case of detecting malicious operations performed by a benign program, the stateful model should represent a sequence of linked operations related to at least the benign program, and the linked operations include at least the malicious operations performed by the benign program. Optionally, the sequence of linked operations can include the non-malicious operations performed by the benign program, possibly also operations of other programs that relate to or linked to the benign program as a result of manipulation.

Figure 3:
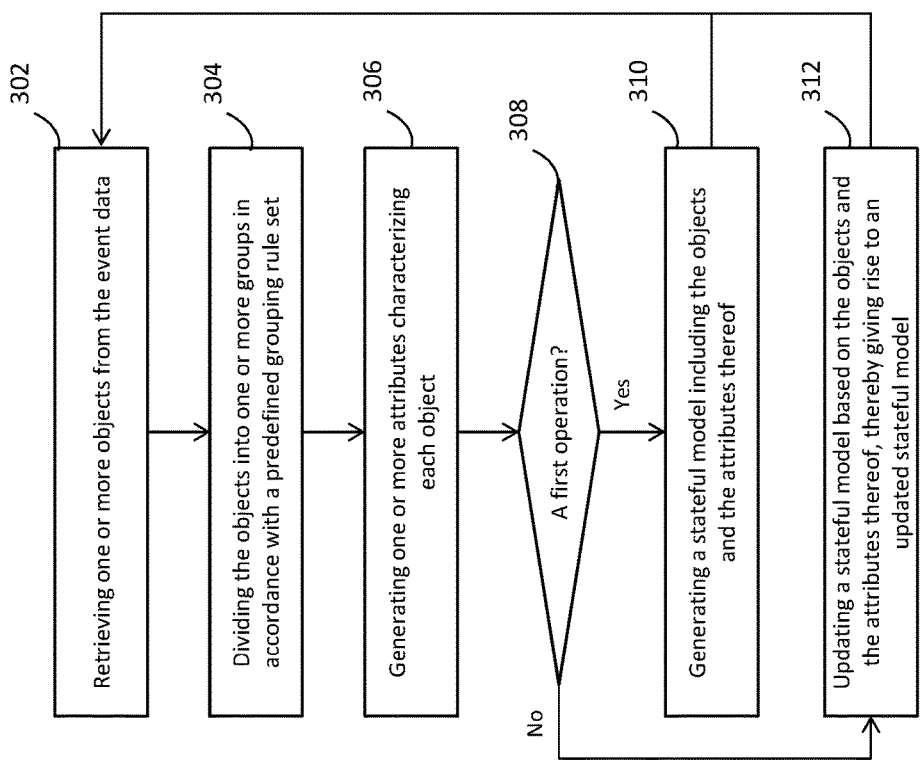
FIG. 3 is a generalized flowchart of building a stateful model in accordance with certain embodiments of the presently disclosed subject matter.

Attention is now directed to FIG. 3, illustrating a generalized flowchart of building a stateful model in accordance with certain embodiments of the presently disclosed subject matter. According to certain embodiments, in some cases, the event data generated by the Monitoring Module 104 is created based on a large amount of raw data gathered through different routes, e.g., low level system calls and kernel driver callbacks, etc, thus the event data are generated in various forms. According to certain embodiments, optionally, this raw form of event data can be normalized by the Event Parsing Module 106 into a logical data structure, giving rise to an abstract event which allows each segment of the attributes encoded in the event data to be accessed and analyzed. Specifically, the Event Parsing Module 106 can format the event data and parse the formatted event data in order to generate the abstract event. Through the event data normalization, event data indicative of similar operations but generated in various forms can also be normalized into a single format and categorized into the same event type. For example, various system API calls generated to allocate memory will be categorized into a single type of abstract event, e.g., a memory allocation event.

According to certain embodiments, the Event Parsing Module 106 can select event data associated with events of interest from all event data received from the Monitoring Module 104 based on one or more predefined filtering rules, and apply the normalization with respect to the selected event data. By way of non-limiting example, the one or more predefined filtering rules can include filtering out event data associated with the following events: uncompleted events, memory related events in which the targeting process is not a remote process, and events in which the targeting process does not exist.

Based on the event data, or in some cases the generated abstract event, a stateful model can be created. If a previous stateful model already exists, then it can be updated. As aforementioned, a stateful model refers to a logical data structure representing the composition and state of a computer system in operation in a live environment. The composition of the computer system can include components such as sub-systems, elements, entities of the system, etc. By way of example, entities of the system, as described above, can be processes, threads, applications, files or any other kinds of suitable elements constituting the computer system. The state of the computer system can be indicated by the stateful model by composing state of each components (e.g., entities) which includes also the associations between these components. The state of the entities can be reflected in the stateful model as attributes characterizing each entity.

According to certain embodiments, the stateful model can be formed by building and updating a network of interconnected objects representing one or more different entities constituting a computer system in operation. The stateful model can further comprise attributes of the objects, such as, e.g., modifiers, flags and other data structures, which are indicative of the state of the entities, including, e.g., the various interactions/relationships/associations between the entities, as will be detailed below.

According to certain embodiments, for each event data characterizing a monitored operation (the event data can optionally be normalized to an abstract event), one or more objects can be retrieved (302) from the event data or the abstract event. As aforementioned, each of the retrieved objects represents an entity related in a corresponding event or operation, and each object can be of a type selected from a group that includes: thread object, process object, file object, network object, registry object, windows object, and memory object, which represent respectively an entity of thread, process, file, network, registry, windows and memory. At least one of the objects represents the source of the event that performs a corresponding operation. By way of non-limiting example, the source of the event can be represented by a process object indicating an originating process that performs the operation. Thus the source of the event/operation is sometimes referred to as source process of the event. For a process P1 performs an operation of "system shutdown". In this case, a process object will be retrieved from the corresponding abstract event to represent P1 as the source of the event.

In some cases an operation is performed upon a target entity (i.e. target of the event) by the source of the event. For example, a process P1 opens a file F1. A process object will be retrieved from the corresponding abstract event to represent P1 as the source of the event for the operation "file open", and a file object will be retrieved to represent F1 as the target of the event.

It is to be noted that an operation is usually initiated by a process. Thus the source of an event is normally represented by a process object. The target of the event, however, can be of various types of objects that are manipulated in the operation, such as a process object, file object, network object, registry object, memory object, etc.

According to further embodiments, a process can own resources, such as a source file that the process is initiated from. The source file can be of various types, such as, by way of non-limiting example, a document file, an image file that contains the executable code that will be executed by the process as part of a program, or any other relevant types of files. A source file, if related to an operation, can also be represented by a file object.

It is to be noted that the above mentioned object types are merely illustrated for exemplary purposes only and should not be construed as limiting the present disclosure in any way. Additional types of objects that may occur in an operation can be included in addition to or instead of the above.

Following retrieving the objects from an event data or an abstract event in step 302, the Event Parsing Module 106 can be configured to divide (304) the objects into one or more groups in accordance with a predefined grouping rule set, each group representing a corresponding group of entities related to a respective program or part thereof running in the operating system. By way of example, the predefined grouping rule set can include a rule of creating a new group if source of a process creation operation is a designated system entity. By way of another example, the predefined grouping rule set can include a rule of creating a new group if source of a process creation operation is a designated system entity.

It is to be noted that, although the stateful model may provide an accurate description of a monitored environment (i.e. computer system in operation), the stateful model is not limited to only include information that reflects the monitored environment per se, but can also further include additional information—i.e. metadata that is inferred by applying predefined algorithms to event data that originates from the monitored environment. Such metadata is not part of the original event data of the computer system itself but is rather derived therefrom. The metadata can be recognized as part of the attributes related to the objects, and may provide a unique interpretation of the state of the computer system in operation which is beyond the scope of the original event data.

According to certain embodiments, the metadata may include an organization layer that establishes order/roles between the different operating entities. In one embodiment, such layer may include grouping information of the objects. By way of example, the entities in the operating system can be divided into different groups. For instance, for each process creation operation, it can be assessed, according to a predefined grouping rule set, if the created process should belong to the group of the process that created it (i.e. the parent of the process) or should the model create a new group for this process. A exemplified rule that might affect a group creation can be to determine whether the parent of the created process (i.e. the source of the process creation operation) is certain system entity (e.g., a specific or designated system process). Such system entity can be recognized by the stateful model and thus can be attributed to a role of determining group division. If the condition is met—a new group will be created and the new process will belong to it. Otherwise, the new process will belong to its parent's group. By dividing entities into groups, the operations initiated by the entities (i.e. the source of the event/operation) can also be identified as belonging to or linked to the same groups as the entities. the Event Parsing Module 106 may further be configured to interpret certain events, under specific predefined conditions, as group creation or destruction events.

For example, it can be determined, based on an event of process creation (e.g., P1 creates P2) where the condition of source entity being specific system process is met (e.g., P1 is specific system process predefined by the stateful model), that a new group should be created for the target process (P2) of the process creation operation.

In Another example, it can be determined, based on an event of process termination (e.g., P1 terminates P2) where the condition of target entity being the last entity alive (e.g., not terminated) in its group is met (meaning all members of group are terminated), that a group can be marked as destroyed or terminated.

It is to be noted that in the case the stateful model is a data model representing the entities and state of the entire operating system (also termed as system-level stateful model below), the grouping of objects and their associated operations are in fact realized in a similar manner as the program-level stateful model as described below. In other words, the objects and operations that are related to a given program can be grouped together when the initiating process of the given program is created by a specific system process, as described above with respect to program-level stateful model.

According to certain embodiments, a program can include one or more parts, and a group of objects can be further divided into one or more sub groups each related to a part of the program. By way of example, in the case of detecting malicious operations performed by a benign program, the stateful model can further indicate a distinction between operations performed by different parts of a program. For example, the stateful model can further include division of operations of a program based on the part of program that performs each operation. This enables to associate monitored operations, not only with the program from which they originate as a whole (i.e. grouping), but also with a specific part within the program (i.e. sub-grouping). The partitioning of a program into sub-programs or parts permits a more granular approach in which a subset of a program can be detected as malicious without reflecting on the other, benign parts of the program. By way of non-limiting example, a program (e.g., a Browser) can be further divided into smaller parts (e.g., sub-browsers) where each part can include one or more processes. One of the division criteria, in this example, can be whether a new Tab in the browser was opened. When such division is applied, and one of the sub-browsers, upon accessing a malicious website, is detected as malicious, only the part of the program, e.g., the sub-browser—the part of the browser program relating to the malicious website, will be treated similarly as malware and be dealt with separately without disrupting other parts of the program thus allowing other sub-browsers to continue accessing other websites.

Next, the Event Parsing Module 106 can be configured to generate (306) one or more attributes characterizing each object, the attributes including at least: a) grouping information including a group indicator indicating to which group the object belongs, as described above with reference to block 304, b) one or more operations associated with said object, the object being source or target of the associated operations, the associated operations being linked to the given program, and c) one or more interconnections between the object and one or more other objects through the associated operations. In the case where a group of objects are further divided into one or more sub groups each related to a part of the program as described above, the grouping information further includes a sub-group indicator indicating to which sub group each object belongs.

It is to be noted that the association between the operations and the object can include both direct and indirect association. Similarly the linkage between the operations and the given program can include both direct and indirect linking relationship. By way of example, the operations of which the object is the direct source or direct target are considered to be directly associated with the object. Similarly these operations directly associated with an object within a group related to the given program are considered to be directly linked to the given program. By way of another example, in the case where the given program is linked to at least a second program as a result of manipulation, an object within a group related to the given program can be an indirect source or target of these operations associated therewith, e.g., through a sequence of linked operations. For instance, the operations associated with an object within a group related to the given program can also include at least a sub set of the operations directly linked to the second program which occur as a result of the manipulation by the object in the given program, and this sub set of operations are also considered to be indirectly linked to the given program.

In order to generate the attributes of the operations associated with the object, the Event Parsing Module 106 can be configured to identify one or more relationships among the entities in accordance with the event data or abstract event (e.g., the operation type in the event data), and generate respective associations among the objects corresponding to the identified relationships, giving rise to an event context corresponding to the abstract event. The event context contains context information of the corresponding event, and comprises the one or more objects of the event and the associations therein. For instance, the associations between two objects can be reflected or represented as attributes characterizing each object including the operations occurred between them and a link or pointer to the other object involved in the operation. Thus the attributes of an object can include, except for a group indicator, operations associated with the object, and a linkage between the object and one or more objects through the associating operations.

Following step 306, the Event Parsing Module 106 can further determine if a current event is a first event (308) of a stateful model, as described below in detail with respect to FIG. 4a. In case of the above condition being met, a new stateful model can be generated (310) and include the event context, namely, the one or more objects and the attributes thereof. The process then goes back to step 302 wherein the next event data can be processed.

Figures 4A, 4B:
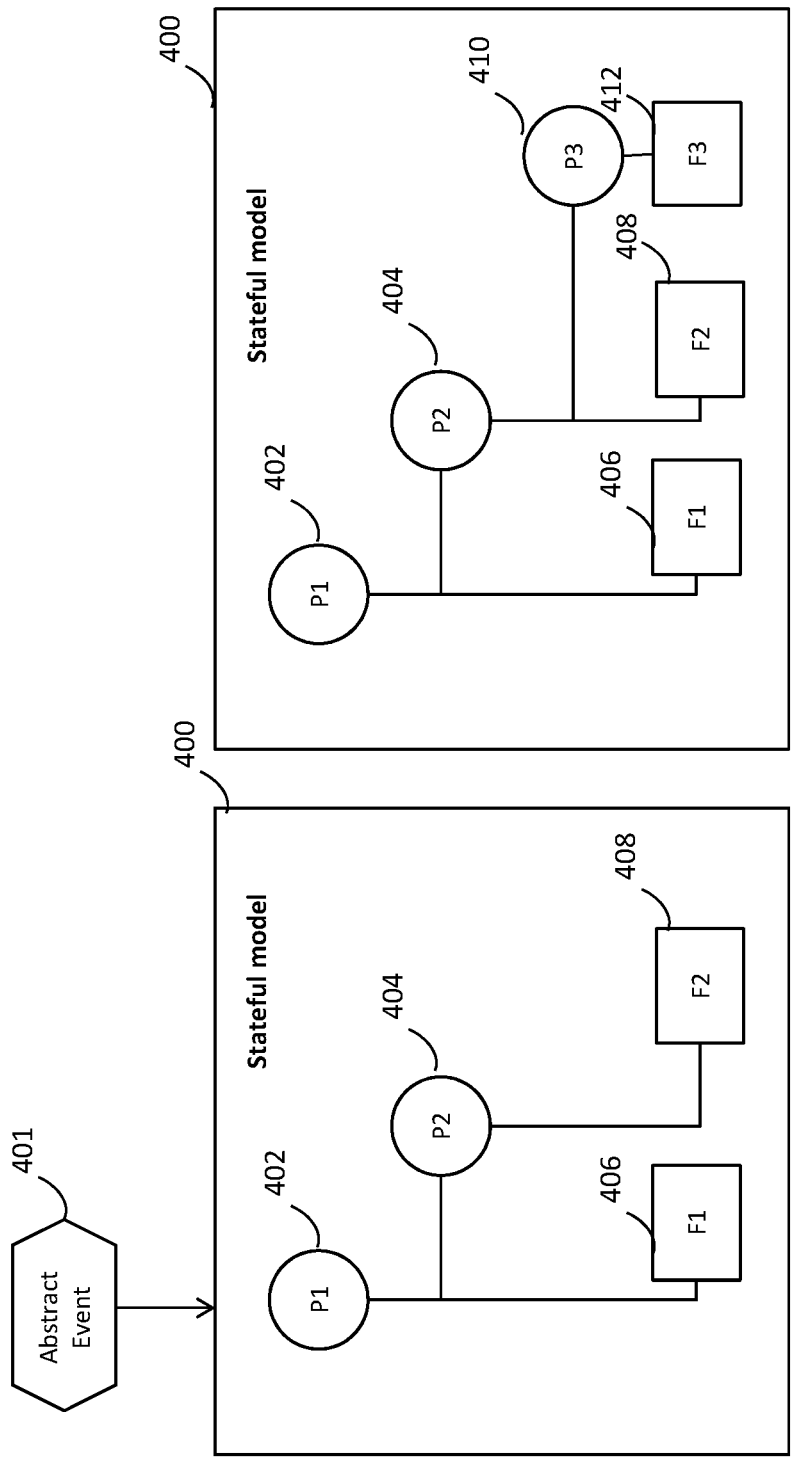
FIGS. 4a and 4b are schematic illustrations of an exemplified stateful model and an exemplified updated stateful model in accordance with certain embodiments of the presently disclosed subject matter.

With reference now to FIG. 4a, there is shown an exemplified stateful model 400 being created based on an abstract event 401, in accordance with certain embodiments of the presently disclosed subject matter. Abstract event 401 is normalized from an event data characterizing an event E1 of a process P1 creating a child process P2. The abstract event 401 comprises the following attributes of the event: operation type—process creation; source of the event—P1 (as the originating process of the event), source file of P1-F1, target of the event—P2 (as a targeting process of the event), and source file of P2-F2. Based on the abstract event 401, four objects can be retrieved: a process object 402 indicative of the source of the event P1, a process object 404 indicative of the target of the event P2, a file object 406 indicative of the source file F1 of P1, and a file object 408 indicative of the source file F2 of P2. According to certain embodiments, file objects 406 and 408 can be affiliated with, or correlated with, or associated with their respective process objects 402 and 404 as illustrated. The abstract data 401 can further include additional attributes which contain more information of the operation if applicable.

A relationship indicative of process creation can be identified between process objects 402 and 404 in accordance with the abstract event. A corresponding association between 402 and 404 can be generated accordingly based on the identified relationship, giving rise to an event context that comprises the process objects 402 and 404 (together with their correlated file objects 406 and 408) and the association therebetween. The association can be represented, e.g., as a direct linkage/interconnection between the two related objects 402 and 404, as illustrated in FIG. 4*a*.

According to certain embodiments, one or more fields, e.g., modifiers, flags, can be created for each of the objects, storing one or more attributes characterizing the respective object. By way of non-limiting example, the process object 402 can have one or more fields selected from a group that includes: process identifier (e.g., a unique identifier assigned by the operating system for each process), one or more source file identifiers (e.g., a pointer to file object 406), and one or more operations and corresponding associations related thereto (e.g., an operation of process creation and a corresponding linkage to P2). The file object 406 can have one or more of fields selected from a group that includes: file identifier (e.g., the full path of the file), process identifier, and one or more operations and corresponding associations related thereto. Assume that E1 is a first event in a stateful model, a stateful model 400 can be generated and include the event context of E1.

It should be noted that the term "stateful model" should be expansively construed to include any of the following situations:

1) A stateful model can be a program-level stateful model that represents a group of entities related to a given program and a sequence of linked operations associated with the entities (and in some cases, also operations related to one or more other programs that are linked to the given program due to associating operations). In this case, a stateful model represents a program context that reflects all the operations related to the given program by context.

A first event of the program-level stateful model can be determined to be any event that relates to the given program's first interaction with the system. For instance, a first event can be determined to be an event of "process creation" that creates the initiating process of the given program. An initiating process is the process that is created upon the given program being executed, which may also be the root process of a stateful model that performs further operations. A first event can also be determined to be an event performed by the initiating process upon other objects.

In the above example illustrated in FIG. 4*a*, if the originating process P1 is the initiating process of a certain program, the creation of P1 can be determined as the first event in the stateful model. Since the initiating process may be created by a system process P0, in some cases the stateful model can include P0, P1 and the association of process creation between P0 and P1. In some other cases the stateful model may include only the object P1, and a reference therewith indicating that P0 is the parent of P1. In some further cases a first event can also be determined as an event that P1 performs on other objects, for example, an event of "process creation" performed by P1 to create a child process P2.

In some circumstances events can be delayed to be processed by the Event Parsing Module 106 due to unexpected system processing problems. Thus a first event of the stateful model can also be an event that does not occur first in terms of time, but is first processed by the Event Parsing Module 106. Accordingly, following the above mentioned example of FIG. 4*a*, if a further event E2 of P2 opening a file F1 is first processed by the Event Parsing Module 106, the event E2 can be determined to be a first event of the stateful model, and any event that occurs before it (e.g., the event E1 of P1 creating P2) can be processed retroactively and reflected in the stateful model.

Thus, depending on the number of programs concurrently running in the live environment and the operational relationships among them, there may be one or more program-level stateful models co-existing, each of which represents a respective program context of a given program;

2) A stateful model can be a system-level stateful model that represents operations related to all programs that run concurrently in a live environment. In this case a first event of the stateful model can be determined to be the event of "system start" that is initiated when the operating system initially starts. Accordingly, there is only one stateful model existing at any given time in the system which represents a system context of the entire environment. According to some embodiments, the system-level stateful model can be created upon the initialization of the operating system, and can be kept updating while the operating system and program processing proceeds. In accordance with further embodiments, the system-level stateful model may be created by including one or more program-level stateful models each related to one program of all the programs running in the live environment as described above. In one aspect, the program-level stateful model is similar to a group related to a given program in a system-level stateful model.

Continuing with the metadata, besides the organization layer, the metadata may also include a bookkeeping layer that provides historical/statistical information of the operations related to the entities. Such bookkeeping information cannot be retrieved from or is not stored in the computer system. In certain embodiments, the attributes characterizing an object can further include bookkeeping information derived from the operations associated with the object. Such bookkeeping information can include one or more of the following: file-system access statistics, memory manipulation history, modification to system settings etc. The bookkeeping information can also include one or more associations between the objects indicated by specific operations involving the objects (e.g. objects that are the source and target of a manipulation operation).

In some examples of bookkeeping, operations related to modification of special types of files (e.g., files that contain machine code) could be analyzed in order to determine an association between the file and the process involved in the modification. In a similar fashion, operations related to memory allocation or memory region allocation could be analyzed to determine an association between the process in which the memory was allocated and the process performing the allocation. Such associations can later lead to additional, indirect associations, for example, between operations linked to objects related to a program and objects related to a different program, resulting in the operations being indirectly linked to a different program instead of related programs by virtue of the previously established association between the objects due to modification/manipulation.

The stateful model may act as an information data repository that can be queried to assert and test conditions relating to the predefined behavioral signatures or building a remediation plan, as will be detailed further below.

It is to be noted that the definition and implementation of the above stateful model structure are illustrated for exemplary purposes only and should not be construed as limiting the present disclosure in any way. Alternative data structures can be applied to implement equivalent functionality of the stateful model in addition to or in lieu of the above.

Turning back to FIG. 3, according to certain embodiments, if the current event is not a first event of a stateful model (308), a previous stateful model corresponding to at least one previous event that precedes the current event exists. The Event Parsing Module 106 can update (312) the previous stateful model based on the objects and the attributes thereof of the current event, giving rise to an updated stateful model.

According to certain embodiments, a previous stateful model can be updated in accordance with the following scenarios:

1) If all the objects of the current event are already included in the previous stateful model, the one or more associations of the event context (e.g., the operations associated with the objects) can be added to the previous stateful model, giving rise to the updated stateful model;

2) Otherwise at least one object of the one or more objects is a new object that does not exist in the previous stateful model. Thus the new object, together with the one or more associated operations, can be added to the previous stateful model, giving rise to the updated stateful model.

An updated stateful model is thereby generated including a network of interconnected objects representing one or more entities constituting the operating system, and one or more attributes thereof indicating the grouping information, operations associated with the objects, and interconnections between the objects through the associated operations.

Continuing with the example illustrated in FIG. 4a, assume that the illustrated stateful model 400 (including process objects P1, P2 and the association between P1 and P2 representing the event E1 of P1 creating P2) is a previous stateful model that exists, and a current event E2 arrives, wherein the same process P1 allocates memory in the same child process P2. Following the process in FIG. 3, the event data that characterizes the current event E2 is normalized to an abstract event. Objects P1 and P2 are retrieved based on the abstract event. A relationship indicative of memory allocation can be identified between P1 and P2 based on the abstract event, and an association between P1 and P2 can be generated based on the identified relationship. Thus an event context for the current event E2 comprises objects P1 and P2 and the association therebetween. Since the current event E2 is not a first event in the previous stateful model 400, the stateful model 400 will be updated based on the current event context. In this case, since all the objects of the current event, namely, P1 and P2, are already included in the previous stateful model 400, the currently generated association between P1 and P2 representing an operation of memory allocation, will be added as a new association between P1 and P2 in the stateful model 400, besides the previous association therebetween representing the operation of process creation, giving rise to an updated stateful model. By way of non-limiting example, the new association can be added in the stateful model by adding a respective attribute for P1 and/or P2 to indicate the operation of memory allocation therebetween. Since only the association has been updated, the hierarchical structure of the updated stateful model may look similar as illustrated in FIG. 4a, with a newly added association.

Continuing with the same example, assume that another event E3 arrives after E2, wherein the process P2 creates a child process P3. Following the same process in FIG. 3, the event data that characterizes the current event E3 is normalized to an abstract event. Objects P2 and P3 are retrieved based on the abstract event. A relationship indicative of process creation can be identified between P2 and P3 based on the abstract event, and an association between P2 and P3 can be generated based on the identified relationship. Thus an event context for the current event E3 comprises objects P2 and P3 and the association therebetween. Since the current event E3 is not the first event in the stateful model 400, the stateful model 400 will be updated based on the current event context. In this case, since P3 is a new object that does not exist in the previous stateful model, the new object P3 can be added to the stateful model 400 as a process object 410. Optionally a file object F3 that is correlated with P3 can also be added as a file object 412. The association between P2 and the new object P3 can be added in the stateful model, by way of non-limiting example, by adding a respective attribute for P2 and/or P3 to indicate the operation of process creation therebetween, together with a linkage or interconnection between these two objects, giving rise to an updated stateful model, as illustrated in FIG. 4b.

It is to be noted that the specific examples of building and updating the stateful model illustrated above are provided for exemplary purposes only and should not be construed as limiting. Accordingly, other ways of implementation of building and updating the stateful model can be used in addition to or in lieu of the above.

It should also be noted that the present disclosure is not bound by the specific sequence of operation steps described with reference to FIG. 3.

Having described the structure of the stateful model and the process of building/updating the stateful model in accordance with certain embodiments, attention is now drawn back to FIG. 2, wherein analyzing at least one stateful model in order to identify one or more behaviors is now described with reference to step 206.

According to certain embodiments, the Behavior Analyzing Module 110 can be further configured to analyze (206) the stateful model to identify one or more behaviors including at least one malicious behavior. For example, the event context of the current event can be analyzed in view of the stateful model (when the stateful model is newly created based on the current event) or the updated stateful model (when the stateful model is updated based on the current event), in accordance with one or more predefined behavioral logics. The analyzing takes into consideration the grouping information of the objects, the interconnection between the objects and the operations associated with the objects.

The Behavior Analyzing Module 110 can further determine the presence of at least one behavior upon any of the one or more predefined behavioral logics being met. The determined behavior relates to a sequence of events of the stateful model including at least the current event. In some cases, each of the sequence of events independently may not be identified as malicious, but when considered within the sequence context, is actually performing a malicious behavior. By analyzing the event context in view of the stateful model, the Behavior Analyzing Module can inspect a specific event while looking at the whole picture, thus avoiding omission of undetected malwares.

According to certain embodiments, the predefined behavioral logics are behavioral signatures indicative of specific behavioral patterns. The behavioral logics can be predefined based on prior knowledge of certain malware behaviors, such as, for instance, self-deletion, self-execution, and code injection, etc. The behavioral logics can be stored in a Behavioral Signature Database 112 as aforementioned with respect to FIG. 1a. One of the predefined behavioral logics can be, by way of non-limiting example, determining a behavior of self-execution when the following condition is met: the target of a process creation operation/event is an object that is already included in the stateful model and is found to be (e.g., by way of querying the model to deduce relation between objects) in the same group as the source of the operation (i.e. the process that performed the process creation operation), which indicates that the process creation operation is performed between objects that belong to the same group.

Another similar exemplary behavioral logic can be, for instance, determining a behavior of self-deletion when the following condition is met: the target of a file deletion operation is an object included in the stateful model, and the object is identified as a source file (i.e. relating to a process object) associated with the source process of the file deletion operation. Another, a bit more complex, exemplary behavioral logic can be, for instance, determining a behavior of self-deletion when the following condition is met: the target of a file deletion operation is an object included in the stateful model. The object is identified as a source file associated with a system process, and the system process is found to be associated with a library file. And the library file is further associated with the source process of the file deletion operation.

Yet another exemplary behavioral logic can be, for instance, determining a behavior of code injection when the following condition is met: a process manipulates another process to perform operations on its behalf.

According to certain embodiment, the stateful model can be queried by the Behavior Analyzing Module 110 to assert one of the predefined behavioral logics. For example, the stateful model can be queried to assert whether the modifier process (i.e. process that performed a modification operation) of a library file and the loader process (i.e. the process that performed a library load operation) belong to the same group. If the assertion fails—meaning the library file belongs to a different group than the loader process, a behavioral logic may be inferred.

Optionally, the predefined behavioral logics can also include one or more logics indicative of benign behavior patterns such as, for example, interaction with the desktop or users, registration in the system program repository, etc. According to certain embodiments, each behavioral signature in the database can be associated with a predefined behavioral score that indicates the malicious level of a corresponding behavior. Accordingly each of the determined at least one behavior can be assigned with a respective behavioral score based on the predefined behavioral score associated therewith. The process of analyzing a stateful model and determining at least one behavior is further exemplified with reference to FIG. 5.

In the case of detecting malicious operations performed by a benign program, e.g., a benign program manipulated by exploit, the identified one or more behaviors should include at least one malicious behavior indicating the malicious operations performed by the benign program or a part of a benign program based on the division information included in the stateful model.

It is to be noted that the hierarchical structure of the stateful model as described above is designed as a fast accessible data structure, which can in turn enable the creating of the stateful model and analyzing the created stateful model, following the monitoring of the operations, to be performed in a real time manner in a live environment.

Upon the at least one behavior being determined, the Decision Making Module 114 can be configured to determine (208) the presence of malicious code based on the at least one malicious behavior and determine a program or part thereof related to the malicious code to be malicious. According to certain embodiments, each stateful model can be associated with a stateful model score. The stateful model score is an aggregated behavioral score of all behavioral scores assigned for respective behaviors being determined in the stateful model. Upon at least one current behavior being determined in a stateful model, the Decision Making Module 114 can search if there is a previous stateful model score associated with a previous stateful model. Accordingly, the previous stateful model score is an aggregated behavioral score of all previous behavioral scores assigned for respective previous determined behaviors, the previous determined behaviors being related to the at least one previous event of the previous stateful model. If there is no previous stateful model score, the sum of the respective behavioral score for each of the at least one behavior can be determined as the stateful model score associated with the current stateful model. Otherwise, if there is found a previous stateful model score, the previous stateful model score can be increased with the sum, giving rise to the stateful model score that has been updated based on the current event. The Decision Making Module 114 can be further configured to compare the stateful model score with a predefined threshold. The predefined threshold can be a score indicative of malware presence and can be predetermined based on prior knowledge of malware detection. If the stateful model score passes the predefined threshold, a presence of malicious code can be determined. A program or part thereof related to the malicious code can be determined to be malicious. For example, the corresponding stateful model, and one or more programs that relate to the stateful model can be determined as malicious. The process of determining the presence of malicious code is further exemplified with reference to FIG. 5.

According to certain embodiments, the respective behavioral score of a currently determined behavior can be assigned with a corresponding weight factor if a condition is met. The condition can be, by way of non-limiting example, that the source of an event is a remote process and the target of the event is a system process, indicating that a remote process is performing operations on a system process. In this case a weight factor (e.g., a numerical value greater than 1) can be assigned to the original behavioral score associated with this behavior, indicating an increasing likelihood of malware presence. The assigned weight factor can be applied to the original behavioral score (e.g., by multiplying the original behavioral score with the weight factor), giving rise to a weighted behavioral score. Accordingly the previous stateful model score can be increased with a sum of the weighted behavioral score assigned for each of the at least one behavior.

It is to be noted that the present disclosure is not bound by the specific scoring and weighting paradigms described above. The scoring and weighting functionalities can be implemented in a consolidated manner or separately. Additional kinds of implementations can be applied in addition or instead of the above.

Optionally, accordingly to certain embodiments, one or more operations linked to the malicious program can be remediated (209) (e.g., by the Mitigation and Remediation Module 116 in FIGS. 1*a* and 1*b*) once the presence of the program is determined, as will be described in details below with respect to FIG. 7.

Figure 7:
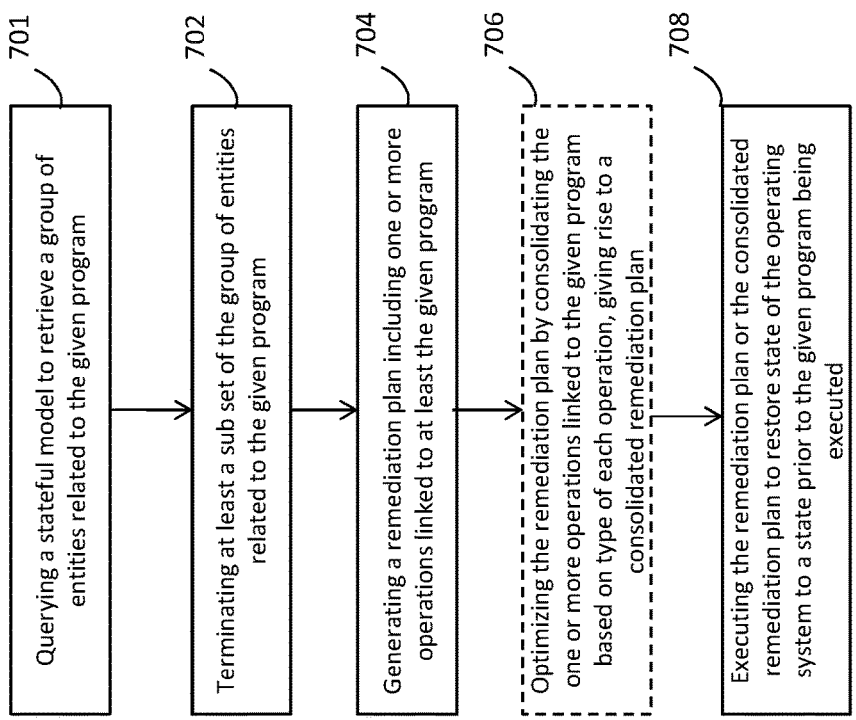
FIG. 7 is a flowchart of remediating one or more operations linked to a given program running in an operating system in accordance with certain embodiments of the presently disclosed subject matter.

Turning now to FIG. 7, there is illustrated a flowchart of remediating one or more operations linked to a given program running in an operating system in accordance with certain embodiments of the presently disclosed subject matter.

According to certain embodiments, one or more operations linked to a given program, e.g., such as the determined malware, can be remediated.

The stateful model can be queried (701) by the Mitigation and Remediation Module 116 to retrieve a group of entities related to the given program. The group of entities related to the given program are retrieved based on a corresponding group of objects which represent the group of entities in the stateful model. Mitigation can be performed (e.g., by the Mitigation Module 118) in order to render the given program (e.g., the malware) or part thereof inactive. This can be achieved, for example, by terminating (702) at least a sub set related to the given program. For instance, one or more processes related to the given program can be terminated and one or more files associated with such processes can be removed. The processes to be terminated and files to be removed can be indicated in the stateful model. As described above with reference to FIGS. 2 and 3, the stateful model is a logical data structure representing composition and state of the operating system in a live environment, the stateful model including a network of one or more interconnected objects representing one or more entities constituting the operating system, and one or more attributes characterizing each object, the objects being divided into one or more groups each representing a corresponding group of entities related to a respective program or part thereof running in the operating system. Specifically, the one or more processes to be terminated refer to the actual processes as reflected/represented by the process objects related to the given program in the stateful model. The processes related to a given program should be expansively construed to include different members in different embodiments.

By way of example, in case of the given program is a detected malware, the processes related to the malware should include the initiating process that is created upon the malware being executed, as well as the subsequent processes that are affected by the root process, the subsequent processes including but not limited to: e.g., the children processes created by the initiating process, and/or other processes manipulated or tampered by the initiating process and/or the children processes. In some cases, the sub set of the group of entities that need to be terminated can be empty, meaning no entities or processes need to be terminated. In this case the step of termination is optional.

In certain embodiments, a group of objects are further divided into one or more sub groups each related to a part of a program, and the attributes further include sub-group indicator indicating to which sub group the object belongs. In this case the querying includes querying a stateful model to retrieve a sub group of entities related to a part of the given program. And the terminating includes terminating the sub group of entities related to the part of the given program.

By way of example, in case of the given program being a benign program manipulated by malicious code, such as. e.g., exploit, the processes to be terminated should include at least one process that performs malicious operations due to manipulation of the given program by the malicious code. Other processes related to the given program which perform the program's regular and intended operations do not have to be terminated. For instance, a benign program, e.g. Adobe Acrobat Reader, can be further divided into smaller parts (i.e. sub-reader) each responsible for a different open document and associated with different processes of the main program. The stateful model can further include the division (e.g., sub-group) of operations based on the part of the program that performs the operation. In this if a document containing malicious code is opened and as a result, as described, a sub-reader is created within the main program to be associated with the malicious document, upon determining the program is acting maliciously, only the sub-reader and its associated processes and the operations relating to them in the stateful model will be considered malicious and be dealt with accordingly without interfering with the normal operation of the other sub-readers.

As aforementioned, in some cases, operations of a given program are not necessarily performed by processes. For instance, the operations can be performed by other system entities, such as part of a process, e.g., one or more instances, or threads within a process. In such cases, it is appreciated a division of groups can be related to instances or threads instead of a program. Instead of terminating a whole process, it is possible to terminate only one or more instances, or threads of a process that performs malicious operations due to manipulation of the given program by the malicious code and the identification of which instances or threads within the process were manipulated. In some cases each part of the program, as mentioned above, can be associated with one or more processes, in other cases a part of the program can be associated with other entities such as, e.g., instances, threads etc.

According to certain embodiments, the files to be removed refer to the files as reflected by the file objects associated with these process objects (e.g., source files) to be terminated as indicated by the stateful model. In one example, as part of the mitigation, additional processes reflected by process objects relating to other programs that have been manipulated or tampered with by the given program (e.g., malware) or part thereof can be terminated as well in order to guarantee that the malware has ceased all execution and is no longer active.

Once the malicious code has been mitigated, meaning, no new event will originate from it, by querying the stateful model, a remediation plan can be generated (704) including one or more operations linked to the given program, the one or more operations being retrieved based on the group in the stateful model. As aforementioned, the operations can directly or indirectly linked to the given program. The operations can include one or more objects involved in each operation and one or more relationships identified among these objects, the one or more relationships indicative of type of the operation, as reflected in the stateful model. The operations to be included in the remediation plan can be selected from all the operations performed by the given program, in accordance with a predetermined criterion. By way of example, in the case of the given program being a benign program manipulated by malicious code, such as exploit, the operations to be included in the remediation plan should include the malicious operations performed by such program or part thereof due to the manipulation of the exploit. For instance, in the example of a reader program divided into sub-readers according to which documents were opened, only the operations relating to the sub-reader identified as malicious will be included in the remediation plan and not the operations relating to the reader program as a whole or other, unrelated sub-readers. It is worth mentioning that the remediation plan isn't pre-conceived and is built dynamically based on the information that is stored and updated in the stateful model by analyzing the events that originate from a computer system in operation.

Optionally according to certain embodiments, the remediation plan can undergo further optimization (706), such as, by way of non-limiting example, by consolidating (e.g., by the consolidation module 119) the list of one or more operations linked to the program based on type of each operation, giving rise to a consolidated remediation plan. In certain embodiments, the consolidation can deduce different categories or sets of objects based on the type of operation performed thereupon. Specifically, the consolidation can include categorizing objects involved in the one or more operations into one or more categories, each category directed to at least one respective type of operation performed upon objects within the category. As a result, the consolidated remediation plan can include the one or more categories of objects. For example, the consolidated remediation plan can include a set of created objects, a set of modified/deleted objects and possibly any other set of objects associated with different type of operations.

In some cases, the consolidated remediation plan can further include one or more undo actions associated with each category of objects, or associated with objects within each category, the undo actions being opposite operations which can be performed in the execution stage (as will be described below) in order to undo or revert the operations linked to the given program such that the system can restore or revert to a state prior to such operations being performed. By way of example, one of the undo actions associated with a category of created objects is to remove an actual system entity represented by each object within the category. By way of another example, one of the undo actions associated with a category of modified/deleted objects is to restore, for an actual system entity represented by each object within the category, to a previous content thereof prior to the program being performed.

Note that an object will be mutually exclusive between these categories. Specifically, each of the objects involved in the one or more operations can belong to only one of the categories such that the categories of objects are mutually exclusive. For example, if the malware created a new file F1 and then proceeded to modify it, F1 will be placed inside the created file objects set only and not the modified/deleted set. In this example, even though there can be numerous operations within the original list of operations relating to F1, after consolidation, the only action relating to F1 within the consolidated remediation plan would be to delete it, instead of modifying it back to a previous state and then deleting it. In another example, if the malware created a new file F2, performed multiple modifications to F2 and then proceeded to delete it, F2 will not be included in any of the sets and thus will have no actions within the consolidated remediation plan. In another example, if the malware performed several modifications to an existing value in the system registry (i.e. modification#1: A→B, modification#2: B→C, modification#3: C→D, modification#4: D→E), after consolidation, these modifications will amount to a single action within the consolidated remediation plan that will effectively restore the value to its original state prior to the modifications (i.e. value=A) rather than restoring each of the modifications. In the above case of the object undergoing a plurality of modifications, one of the undo actions associated with an object within the category of modified/deleted objects is to restore, for an actual system entity represented by the object, to an original content thereof prior to the plurality of modifications.

Once the generation of the remediation plan is complete the process moves to the execution phase (e.g., by the remediation module 120). The actual system remediation can be performed by executing (708) the remediation plan by undoing at least part of the one or more operations linked to the given program thereby restoring state of the operating system to a state prior to the given program being executed. This can include iterating the list of operations in the remediation plan and applying the appropriate undo action for each operation in the aim to undo it. Each operation can have its own undo action that would be applied thereupon. The appropriate action for each operation may already be included in the remediation plan, as above described, or alternatively, the action can be derived in the execution phase according to the category of the operation. For example, an operation that involves the creation of an object would achieve remediation by removing the actual system entity reflected by the object, an operation that involves the modification/deletion of an object would achieve remediation by restoring the content of the object and so forth.

According to certain embodiments, if the remediation plan has been optimized and consolidated in the previous phase, as described above, the actual system remediation can be performed by executing the consolidated remediation plan including iterating different categories of objects generated during the consolidation process where each category can have its own undo actions that would be applied on each member of the set. For example, the set of created objects can achieve remediation by removing the actual system entities reflected by the objects in the set. The set of modified/deleted objects can achieve remediation by restoring the contents of the objects. In some cases, a category of objects can have respective undo actions associated with different objects within the category. For example, an undo action for a deleted object within the modified deleted category would be different from an undo action for a modified object within the same category. In another example, an undo action for an object that was modified once would be different from an undo action for an object that went through a few modifications.

Furthermore, according to certain embodiments, the actual implementation of the remediation action derived based on the operation category (i.e. creation/deletion/modification/etc.), can be further refined according to each type of object involved in the operation. For example, for files objects, if the operation category is creation of these file objects, the remediation can be implemented by deleting the actual files reflected by the file objects from the filesystem. If the operation category is modification/deletion of these file objects, the remediation can be implemented by utilizing the storage module 105 and more specifically the filesystem history 117 within the storage module, in order to restore the actual file to its previous content prior to the modification/deletion operation performed by the given program (e.g., malware). The filesystem history 117 is a component within the storage module 105 in charge of keeping track of filesystem changes thus allowing the restoration of such changes. The tracking of changes is done by making copies of low level transactions between the Operating System and the file system starting from a specific point in time. Such tracking of changes can be performed every fixed time interval, such as, e.g., monthly, weekly, daily or hourly, etc. This effectively produces a snapshot of the filesystem every fixed time interval that can be accessed via the filesystem history 117 in order to fetch previous versions of files. In another example, for registry objects, if the operation category is modification/deletion, the remediation can be implemented using the stateful model by accessing the data contained within the modification/deletion operation itself in the stateful model. For instance, the changes of registry, including the previous registry value and the current registry value after changes, can be recorded/docketed within the data associated with the modification/deletion operations in the stateful model such that each operation involving a modification/deletion of a registry value can contain the previous value therefore allowing the restoration of the value to its previous content.

Once the remediation plan has been executed, the system is restored to a state that is identical to the state of the system before the malware program executed.

According to certain embodiments, in case where the given program is linked to at least a second program as a result of manipulation (i.e., the second program is manipulated by the given program), the method of remediation should comprise: querying a stateful model to retrieve a first group of entities related to the given program and a second group of entities related to the second program, wherein a sub set of the operations directly linked to the second program which occur as a result of the manipulation are indirectly linked to the given program; determining a sub set of the second group of entities that are manipulated by the given program to be terminated and terminating the sub set of the second group of entities; generating a remediation plan including one or more operations linked to the given program (it is to be noted that the operations linked to the given program include both operations directly linked to the given program and operations (i.e., a sub set of the operations directly linked to the second program which occur as a result of the manipulation of the given program) indirectly linked to the given program); and executing the remediation plan by undoing at least part of the one or more operations linked to the given program thereby restoring state of the operating system to a state prior to the given program being executed.

It is to be noted that although certain embodiments of the above remediation process as illustrated with reference to FIG. 1*b* and FIG. 7 are described with respect to a detection of malware, the utilization of such remediation process is not limited to only remediating operations performed by a malware, and it is also not limited to be performed in response to a detection of malware. Such remediation process can be applied to remediate any undesired operations performed by a certain program, irrespective of whether such program being malicious or not. By way of example, based on a user input indicating a certain program running in the system (e.g., an application program, or a system program, etc), the remediation process can be performed to remediate at least some of the operations linked to such specific program in order to restore the state of the system to a state prior to such program being executed. One of such examples is when a benign program is manipulated by malicious code such as exploit, the remediation process can be used to remediate the malicious operations that are performed by such benign program (or part of the program, such as part of the processes associated with the benign program that perform the malicious operations).

According to further embodiments, an output of the determined malware can be provided through the I/O Interface 103 to the end users, as aforementioned.

According to certain embodiments, the sequence of operations described with reference to FIG. 2, e.g., the monitoring operations, building stateful model, analyzing behaviors, determining malware and eliminating the determined malware, can be carried out concurrently in real time. For instance, building at least one stateful model in accordance with the one or more operations responsive to monitoring the one or more operations of at least one program concurrently running in a live environment can be performed in real time. Additionally or alternatively, analyzing the at least one stateful model to identify one or more behaviors responsive to monitoring the one or more operations and building the at least one stateful model can be performed in real time. Additionally or alternatively, determining the presence of malware based on the identified one or more behaviors responsive to analyzing the at least one stateful model can be performed in real time. Additionally or alternatively, eliminating the determined malware responsive to determining the presence of malware can be performed in real time.

It is to be noted that the present disclosure is not bound by the specific sequence of operation steps described with reference to FIG. 2.

Figure 5:
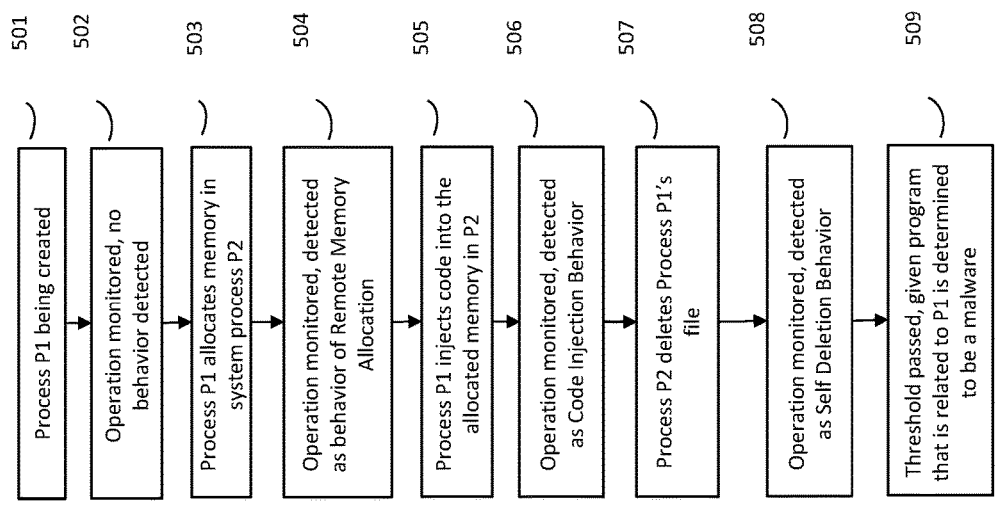
FIG. 5 is a generalized flowchart of an exemplified sequence of operations being monitored and processed in accordance with certain embodiments of the presently disclosed subject matter.

Turning now to FIG. 5, there is shown a generalized flowchart of an exemplified sequence of operations being monitored and processed in accordance with certain embodiments of the presently disclosed subject matter.

As shown, a process P1 is created (501) upon a given program being executed. Thus P1 is the initiating process of the given program. The operation of process creation is monitored, e.g., by the kernel monitoring module. A corresponding event E1 and event data thereof are generated accordingly. E1 is determined to be the first event of a stateful model, and the stateful model is generated based on E1. The stateful model will now include an event context of E1, namely, P1 (optionally, also a system process P0 that creates P1, and/or the source file F1 of P1), together with an association of process creation of P1. No behavior is determined (502) at this stage in accordance with the predefined behavioral logics, and, accordingly no score is assigned.

A second operation of P1 allocating memory to a system process P2 (503) occurs. The operation of memory allocation is monitored, e.g., by the in-process monitoring module. A corresponding event E2 and event data thereof are generated accordingly. Since E2 is not the first event of a stateful model, the previous stateful model comprising event context E1 is updated based on E2. The stateful model now includes P1, P2 (optionally also their source files F1 and F2) together with an association of memory allocation between P1 and P2. A behavior of remote memory allocation is determined (504) in accordance with one of the predefined behavioral logics, and accordingly a behavioral score S1 is assigned. Since there is no previous stateful model score, the behavioral score S1 is also the stateful model score.

Following the second operation, a third operation of P1 injecting code (505) in the allocated memory in P2 occurs. According to certain embodiments, the operation of code injection can comprise three actions: memory write, memory execution permissions, and code execution, all of which are monitored. A corresponding event E3 and event data thereof are generated accordingly. Since E3 is not the first event of a stateful model, the previous stateful model based on event context of E1 and E2 are further updated based on the current event E3. The stateful model now includes P1, P2 (optionally also their source files F1 and F2), a previous association of memory allocation between P1 and P2, and a new association of code injection between P1 and P2. A behavior of code injection is determined (506) in accordance with one of the predefined behavioral logics, and accordingly a behavioral score S2 is assigned. The stateful model score is updated to be the sum of S1 and S2.

A fourth operation of P2 deleting P1's file F1 (507) follows the third operation. The operation of file deletion is monitored. A corresponding event E4 and event data thereof are generated accordingly. Since E4 is not the first event of a stateful model, the previous stateful model based on previous events E1, E2 and E3 are now updated based on E4. The present stateful model includes P1, P2, F1 (optionally also source file F2), two associations (i.e. memory allocation, and code injection) between P1 and P2, and a new association of file deletion between P2 and F1. Based on analyzing the stateful model, it is noted that P1 is actually the parent of P2. A behavior of self-deletion is determined (508) in accordance with one of the predefined behavioral logics, and a behavioral score S3 is assigned. Now the stateful model score is updated to be the sum of S1, S2 and S3. If the stateful model score passes a predefined threshold, the presence of malware is determined. For example, the stateful model, especially the given program that is related to P1 is determined to be malicious, and will be eliminated (509). For instance, the process objects P1 and P2 are terminated, the file objects F1 and F2 are removed, and the relevant operations between P1 and P2, such as memory allocation, code injection, file deletion etc, can be remediated if possible.

It is to be noted that the specific examples illustrated above with reference to FIG. 5 are provided for exemplary purposes only and should not be construed as limiting the present disclosure in any way.

Figure 6:
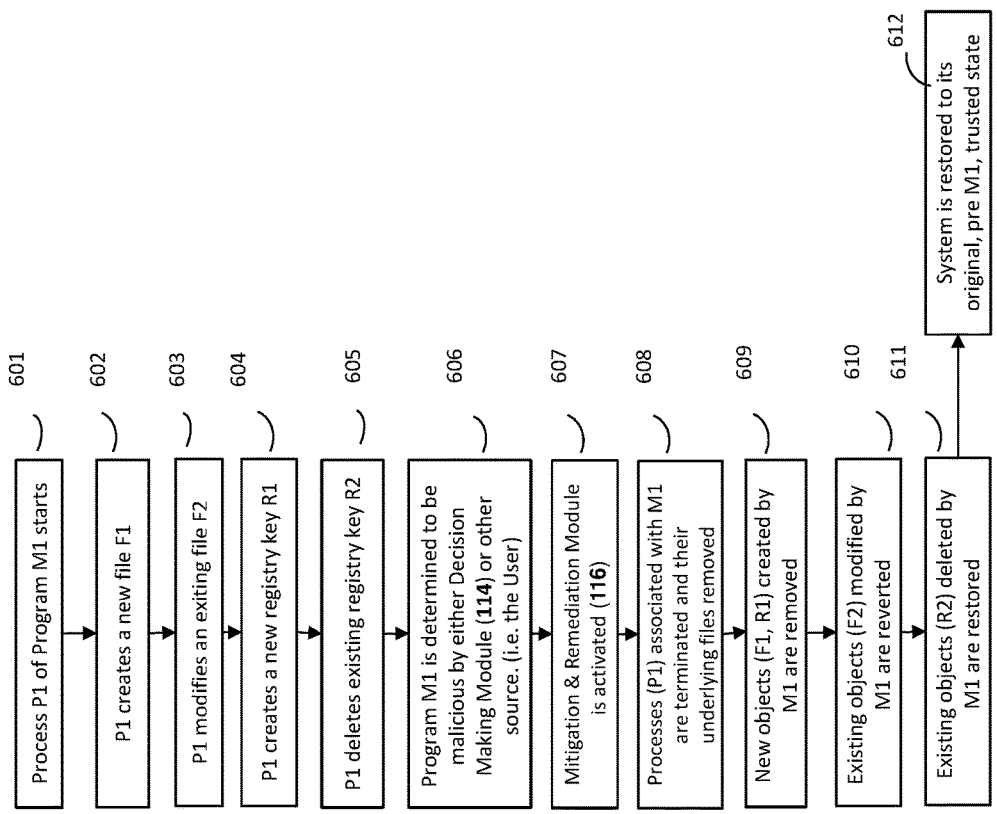
FIG. 6 shows a generalized flowchart of an exemplified sequence of operations being monitored, processed and remediated in accordance with certain embodiments of the presently disclosed subject matter.

Turning now to FIG. 6, there is shown a generalized flowchart of an exemplified sequence of operations being monitored, processed and remediated in accordance with certain embodiments of the presently disclosed subject matter.

As shown, a process P1 is created (601) upon a given program M1 being executed. Thus P1 is the initiating process of the given program. P1 then proceeds to perform a file creation operation (602) of a new file F1 which is monitored by the kernel monitoring module and associated with its stateful model as described earlier. P1 then proceeds to perform a file modification operation (603) of an existing file F2 which is also monitored and associated with P1's stateful model. P1 then performs additional registry operations (604, 605) of creating a new registry key R1 and deleting an existing registry key R2, that are also monitored by the kernel module and associated via corresponding objects with its stateful model. At this point, via detection mechanisms detailed previously or other means, (i.e. user input, external source, etc), P1 and its associated program M1 are determined to be malicious (606) and the Mitigation and Remediation Module 116 is activated (607). The Mitigation and Remediation Module 116 then queries the stateful model to retrieve a group of entities related to M1. For example, it can obtain all relevant information from the stateful model such as processes linked to program M1, their associated operations and additional objects originating from such operations. The Mitigation and Remediation Module 116 can then proceed to handle any actionable operation in the aim of reversing its effect on the system or any of its subparts. It begins by terminating process objects (e.g., P1) associated with program M1 (608) and removing their underlying files objects (files related to or associated with the process) (e.g., source file of P1). It then proceeds to generate a remediation plan based on the operations linked to M1 in the stateful model, the remediation plan including at least some of the operations performed by P1, and optionally also undo actions to be performed in order to undo these operations. Next the process continues to execute the remediation plan. Specifically in this case, it will remove (609) from the system any object (e.g., F1, R1) newly created by any process object associated with the malicious program M1. It then continues to repair existing objects (e.g., F2) that were modified by malicious program M1 by restoring it (610) to its original content by accessing the filesystem history 117, effectively reverting the changes done by M1. Lastly, deleted objects (e.g., R2) that were removed by malicious program M1 will be restored (611) by obtaining the previous registry value of R2 before deletion from the stateful model. The intent of a successful remediation is that the system will return to its state prior to the malicious program's execution, essentially undoing the effect of the operations performed by the malicious program.

It is to be noted that the specific examples illustrated above with reference to FIG. 6 are provided for exemplary purposes only and should not be construed as limiting the present disclosure in any way.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A computerized method of remediating one or more operations linked to a given program running in an operating system, the method comprising:

querying a stateful model to retrieve a group of entities related to the given program, the stateful model being a logical data structure representing composition and state of the operating system in a live environment, the stateful model including a network of one or more interconnected objects representing one or more entities constituting the operating system, and one or more attributes characterizing each object, said objects being divided into one or more groups each representing a corresponding group of entities related to a respective program or part thereof running in the operating system, said attributes of each object including at least:

i) a group indicator indicating to which group said object belongs, ii) one or more operations associated with said object, said object being source or target of the associated operations, said associated operations being linked to the given program, and iii) one or more interconnections between said object and one or more other objects through the associated operations, wherein said group of entities related to the given program are retrieved based on a corresponding group of objects which represent said group of entities in the stateful model;

terminating at least a sub set of said group of entities related to the given program;

generating a remediation plan including one or more operations linked to the given program, said one or more operations being retrieved based on said group in the stateful model; and executing the remediation plan by undoing at least part of said one or more operations linked to the given program thereby restoring state of the operating system to a state prior to the given program being executed.

2. The computerized method of claim 1, wherein each of said objects is of a type selected from a group that includes: thread object, process object, file object, network object, registry object, windows object, and memory object, which represents respectively an entity of thread, process, file, network, registry, windows and memory.

3. The computerized method of claim 1, wherein said objects are divided into one or more groups based on a predefined grouping rule set.

4. The computerized method of claim 3, wherein the predefined grouping rule set includes a rule of creating a new group if source of a process creation operation is a designated system entity.

5. The computerized method of claim 3, wherein the predefined grouping rule set includes a rule indicating a group is terminated if target of a process termination operation is a last entity alive in the group.

6. The computerized method of claim 1, wherein the attributes further include bookkeeping information of the operations associated with said object, said bookkeeping information including one or more of the following: filesystem access statistics, memory manipulation history, modification to system settings, and interactions between entities.

7. The computerized method of claim 6, wherein the bookkeeping information is generated by keeping track of operations related to modification and/or manipulation.

8. The computerized method of claim 1, wherein a group of objects are further divided into one or more sub groups each related to a part of a program, and the attributes further include sub-group indicator indicating to which sub group the object belongs, wherein said querying including querying a stateful model to retrieve a sub group of entities related to a part of the given program; and wherein said terminating includes terminating the sub group of entities related to the part of the given program.

9. The computerized method of claim 1 further comprising generating the stateful model and identifying the given program by analyzing the stateful model.

10. The computerized method of claim 1, further comprising optimizing the remediation plan by consolidating the one or more operations linked to the given program based on type of each of said operations and generating a consolidated remediation plan, and wherein said executing includes executing the consolidated remediation plan.

11. The method claim 10, wherein the consolidating includes categorizing objects involved in the one or more operations linked to the given program into one or more categories, each category directed to at least one respective type of operation performed upon objects within the category, and wherein said consolidated remediation plan includes the one or more categories of objects.

12. The computerized method of claim 11, wherein the consolidated remediation plan includes at least one of the following categories: a category of created objects, and a category of modified/deleted objects.

13. The computerized method of claim 11, wherein each of said objects involved in the one or more operations linked to at least the given program belongs to only one of said categories such that said categories of objects are mutually exclusive.

14. The computerized method of claim 10, wherein the consolidated remediation plan further includes one or more undo actions associated with each of said categories of objects, said undo actions being one or more opposite operations to be executed in order to revert the one or more operations linked to at least the given program on objects within each of said categories.

15. The computerized method of claim 14, wherein one of said undo actions associated with a category of created objects is to remove an actual system entity represented by each object within the category.

16. The computerized method of claim 14, wherein one of said undo actions associated with a category of modified/deleted objects is to restore, for an actual system entity represented by each object within the category, to a previous content thereof prior to the given program or part thereof being executed.

17. The computerized method of claim 16, wherein one of said undo actions associated with an object within the category of modified/deleted objects, in case of said object undergoing a plurality of modifications, is to restore, for an actual system entity represented by said object, to an original content thereof prior to said plurality of modifications.

18. The computerized method of claim 14, wherein said executing consolidated remediation plan includes performing, for each object within a category of said categories of objects, the undo actions associated with said category.

19. The method claim 14, wherein said executing consolidated remediation plan is performed in accordance with type of each object within a category.

20. The computerized method of claim 16, wherein the previous content of each object is recorded in the stateful model or in a file system history module.

21. The computerized method of claim 1, wherein said given program is linked to at least a second program as a result of manipulation, and the method comprises:

querying a stateful model to retrieve a first group of entities related to the given program and a second group of entities related to the second program, wherein a sub set of the operations directly linked to the second program which occur as a result of the manipulation are indirectly linked to the given program;

determining a sub set of said second group of entities that are manipulated by the given program to be terminated and terminating said sub set of said second group of entities;

generating a remediation plan including one or more operations linked to the given program; and executing the remediation plan by undoing at least part of said one or more operations linked to the given program thereby restoring state of the operating system to a state prior to the given program being executed.

22. The computerized method of claim 1, wherein said executing the remediation plan is performed by undoing each of said one or more operations linked to at least the given program.

23. The computerized method of claim 1, wherein the given program is a malware or a benign program.

24. The computerized method of claim 1, wherein the given program is a benign program and the one or more entities related to the given program include at least one entity performing malicious operations due to manipulation of the given program by malicious code, and wherein the one or more operations linked to at least are selected to be the malicious operations.

25. A system remediating one or more operations linked to a given program running in an operating system, the system comprising a processor operatively connected to a memory, the processor configured to:
    query a stateful model to retrieve a group of entities related to the given program, the stateful model being a logical data structure representing composition and state of the operating system in a live environment, the stateful model including a network of one or more interconnected objects representing one or more entities constituting the operating system, and one or more attributes characterizing each object, said objects being divided into one or more groups each representing a corresponding group of entities related to a respective program or part thereof running in the operating system, said attributes of each object including at least:
        i) a group indicator indicating to which group said object belongs,
        ii) one or more operations associated with said object, said object being source or target of the associated operations, said associated operations being linked to the given program, and
        iii) one or more interconnections between said object and one or more other objects through the associated operations,
    wherein said group of entities related to the given program are retrieved based on a corresponding group of objects which represent said group of entities in the stateful model;
    terminate at least a sub set of said group of entities related to the given program;
    generate a remediation plan including one or more operations linked to the given program, said one or more operations being retrieved form said group in the stateful model; and
    execute the remediation plan by undoing at least part of said one or more operations linked to the given program thereby restoring state of the operating system to a state prior to being executed.

26. A computerized method of detecting malicious code related to a program in an operating system in a live environment, the method comprising:
    monitoring one or more operations performed in the operating system in the live environment and generating an event data characterizing each monitored operation, wherein said event data includes at least the following attributes of said monitored operation: operation type, and source of the operation;
    building a stateful model in accordance with the event data characterizing each monitored operation, the stateful model being a logical data structure representing composition and state of the operating system in the live environment, wherein said building comprises:
        for each event data characterizing a monitored operation:
            retrieving one or more objects from the event data, said objects representing one or more entities involved in the monitored operation, each object being of a type selected from a group that includes: process object, file object, network object, registry object, windows object and memory object, at least one of said objects representing the source of the operation;
            dividing the objects into one or more groups in accordance with a predefined grouping rule set, each group representing a corresponding group of entities related to a respective program or part thereof running in the operating system;
            generating one or more attributes characterizing each object, said attributes including at least: a) grouping information including a group indicator indicating to which group said object belongs, b) one or more operations associated with said object, said object being source or target of the associated operations, said associated operations being linked to and c) one or more interconnections between said object and one or more other objects through the associated operations; and
            in case of said monitored operation being a first operation of a stateful model, generating a stateful model including said objects and the attributes thereof;
        otherwise updating a stateful model based on said objects and the attributes thereof, thereby giving rise to an updated stateful model including a network of interconnected objects representing one or more entities constituting the operating system, and one or more attributes thereof indicating the grouping information, operations associated with the objects, and interconnections between the objects through the associated operations;
    analyzing the stateful model to identify one or more behaviors including at least one malicious behavior, including:
        analyzing the updated stateful model in accordance with one or more predefined behavioral logics, wherein said one or more predefined behavior logics are behavior signatures indicative of specific behavioral patterns, said analyzing taking into consideration the grouping information of the objects, the interconnection between the objects and the operations associated with the objects; and
        determining that at least one malicious behavior of said one or more behaviors is present if any of said one or more predefined behavioral logics are met, and determining the presence of malicious code based on the at least one malicious behavior, and determining a program or part thereof related to the malicious code to be malicious.

27. The computerized method of claim 26, wherein the program includes one or more parts, and wherein a group of objects are further divided into one or more sub groups each related to a part of said program, and the grouping information further includes a sub-group indicator indicating to which sub group each object belongs.

28. The computerized method of claim 26, further comprising remediating one or more operations linked to the program.

29. The computerized method of claim 28, wherein said remediating includes:
- querying the stateful model to retrieve a group of entities related to the program, wherein said group of entities related to the program are retrieved based on a corresponding group of objects which represent said group of entities in the stateful model;
- terminating at least a sub set of said group of entities related to the program;
- generating a remediation plan including one or more operations linked to the program, said one or more operations being retrieved from said group in the stateful model; and
- executing the remediation plan by undoing at least part of said one or more operations linked to the given program thereby restoring state of the operating system to a state prior to the program being executed.

30. The computerized method of claim 26, wherein the predefined behavioral logics include determining a behavior of self-execution when the following condition is met: a target of a process creation operation is an object that is included in the same group as a source of the process creation operation.

31. The computerized method of claim 26, wherein the predefined behavioral logics include determining a behavior of self-deletion when the following condition is met: a target of a file deletion operation is a source file associated with a source process of the file deletion operation.

32. The computerized method of claim 26, wherein the predefined behavioral logics include determining a behavior of code injection when the following condition is met: a process manipulates another process to perform operations on its behalf.

* * * * *

UNITED STATES PATENT AND TRADEMARK OFFICE
CERTIFICATE OF CORRECTION

PATENT NO. : 10,102,374 B1  
APPLICATION NO. : 15/766339  
DATED : October 16, 2018  
INVENTOR(S) : Almog Cohen et al.

Page 1 of 1

It is certified that error appears in the above-identified patent and that said Letters Patent is hereby corrected as shown below:

On the Title Page  
Item (57), Abstract, Line 9, change "mare" to --more--.

In the Drawings  
Sheet 7 of 8 (Reference Numeral 603) (Fig. 6), Line 1, change "exiting" to --existing--.

In the Specification  
Column 8, Line 39, change "and or" to --and/or--.

Column 13, Line 44-48, delete "According to certain embodiments, the Processing Unit 101 is further configured to perform at least one of the aforementioned operations of the functional components of the Malicious code Detection and Remediation System 100 in real time." and insert the same on Column 13, Line 45 as a new paragraph.

Column 15, Line 45, change "manner" to --manner.--.

Column 19, Line 9, change "the Event" to --The Event--.

Column 19, Line 18, change "Another" to --another--.

Column 22, Line 24, change "program;" to --program.--.

Column 28, Line 2, change "as." to --as--.

In the Claims  
Column 36, Line 1, in Claim 11, after "method" insert --of--.

Column 36, Line 45, in Claim 19, after "method" insert --of--.

Column 37, Line 17 (approx.), in Claim 25, before "system" insert --computerized--.

Signed and Sealed this  
Sixteenth Day of April, 2019

Andrei Iancu  
*Director of the United States Patent and Trademark Office*